US012675716B2

(12) United States Patent
Hamilton et al.

(10) Patent No.: US 12,675,716 B2
(45) Date of Patent: Jul. 7, 2026

(54) MACHINE LEARNING TECHNIQUES FOR ENHANCED REDIRECTION RECOMMENDATION USING REAL-TIME ADJUSTMENT

(71) Applicant: UnitedHealth Group Incorporated, Minnetonka, MN (US)

(72) Inventors: Rick A. Hamilton, Charlottesville, VA (US); Garry Choy, Irvine, CA (US); Rafael Campos Do Amaral E Vasconcellos, Plymouth, MN (US); Gregory J. Boss, Saginaw, MI (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 981 days.

(21) Appl. No.: 17/643,050

(22) Filed: Dec. 7, 2021

(65) Prior Publication Data

US 2023/0177369 A1 Jun. 8, 2023

(51) Int. Cl.
*G06N 7/01* (2023.01)
*G06N 20/00* (2019.01)

(52) U.S. Cl.
CPC .............. *G06N 7/01* (2023.01); *G06N 20/00* (2019.01)

(58) Field of Classification Search
CPC .......... G06N 7/01; G06N 20/00; G06N 20/10; G06N 20/20; G06N 3/044; G06N 3/045; G06N 3/08; G06N 5/01
See application file for complete search history.

(56) References Cited

U.S. PATENT DOCUMENTS

| | | | |
|---|---|---|---|
| 5,611,350 | A | 3/1997 | John |
| 6,944,536 | B2 | 9/2005 | Singleton |
| 9,886,493 | B2 | 2/2018 | Coleman et al. |
| 9,965,590 | B1 | 5/2018 | Zeiger et al. |
| 10,074,059 | B1 | 9/2018 | Albro et al. |
| 10,368,806 | B2 | 8/2019 | Kim |

(Continued)

FOREIGN PATENT DOCUMENTS

| | | |
|---|---|---|
| CN | 106778038 A | 5/2017 |
| IN | 201841026405 A | 7/2020 |

(Continued)

OTHER PUBLICATIONS

Kamran, M. and Javed, A., "A Survey of Recommender Systems and Their Application in Healthcare," Technical Journal, University of Engineering and Technology (UET), Taxila, Pakistan, vol. 20, No. IV, 2015, pp. 111-119 (Year: 2015).*

(Continued)

*Primary Examiner* — Ann J Lo
(74) *Attorney, Agent, or Firm* — Alston & Bird LLP

(57) ABSTRACT
Various embodiments of the present invention provide methods, apparatus, systems, computing devices, computing entities, and/or the like for performing predictive data analysis operations. For example, certain embodiments of the present invention utilize systems, methods, and computer program products that perform predictive data analysis operations by generating predicted redirection scores based at least in part on: (i) generic redirection scores that are generated using provider evaluation machine learning models, and (ii) real-time redirection scores that are generated using real-time adjustment machine learning models.

20 Claims, 9 Drawing Sheets

(56) References Cited

U.S. PATENT DOCUMENTS

| | | | |
|---|---|---|---|
| 10,559,386 | B1 | 2/2020 | Neumann |
| 10,572,626 | B2 | 2/2020 | Balram |
| 10,754,923 | B2 | 8/2020 | Soenksen et al. |
| 10,943,407 | B1 | 3/2021 | Morgan et al. |
| 2003/0216938 | A1 | 11/2003 | Shour |
| 2009/0198733 | A1 | 8/2009 | Gounares et al. |
| 2010/0312581 | A1 | 12/2010 | Wachtell et al. |
| 2012/0096089 | A1 | 4/2012 | Barash et al. |
| 2012/0185275 | A1 | 7/2012 | Loghmani |
| 2013/0035955 | A1 | 2/2013 | Torres |
| 2013/0224117 | A1 | 8/2013 | Royall et al. |
| 2013/0226601 | A1 | 8/2013 | Razmi et al. |
| 2015/0081326 | A1 | 3/2015 | Krishnapuram et al. |
| 2015/0164363 | A1 | 6/2015 | Kocher et al. |
| 2015/0248470 | A1 | 9/2015 | Coleman et al. |
| 2015/0248536 | A1 | 9/2015 | Tawil et al. |
| 2016/0055307 | A1 | 2/2016 | Macoviak et al. |
| 2016/0071171 | A1 | 3/2016 | Cancelliere, III et al. |
| 2016/0231122 | A1* | 8/2016 | Beaurepaire ....... G01C 21/3461 |
| 2017/0098051 | A1 | 4/2017 | Balram |
| 2017/0103181 | A1 | 4/2017 | Czerska |
| 2018/0285527 | A1 | 10/2018 | Abadir |
| 2019/0065688 | A1 | 2/2019 | Lee et al. |
| 2019/0110753 | A1 | 4/2019 | Zhang et al. |
| 2019/0171438 | A1 | 6/2019 | Franchitti |
| 2019/0295703 | A1 | 9/2019 | Das et al. |
| 2019/0387335 | A1 | 12/2019 | Hughes et al. |
| 2019/0387998 | A1 | 12/2019 | Garten et al. |
| 2020/0015696 | A1 | 1/2020 | Connolly et al. |
| 2020/0066397 | A1 | 2/2020 | Rai et al. |
| 2020/0121544 | A1 | 4/2020 | George et al. |
| 2020/0155061 | A1 | 5/2020 | Pradeep |
| 2020/0210868 | A1* | 7/2020 | Gharat ..................... G06N 5/04 |
| 2020/0215296 | A1 | 7/2020 | Rabin et al. |
| 2020/0222010 | A1 | 7/2020 | Howard |
| 2020/0242624 | A1 | 7/2020 | Boukari |
| 2020/0302825 | A1 | 9/2020 | Sachs et al. |
| 2020/0303045 | A1 | 9/2020 | Harnach |
| 2020/0334809 | A1 | 10/2020 | Vianu et al. |
| 2020/0337625 | A1 | 10/2020 | Aimone et al. |
| 2020/0397534 | A1* | 12/2020 | Farrelly ................. G16H 50/70 |
| 2020/0411170 | A1 | 12/2020 | Brown et al. |
| 2021/0022638 | A1 | 1/2021 | Holcman et al. |
| 2021/0022688 | A1* | 1/2021 | Lee ........................ G06N 3/044 |
| 2021/0057112 | A1* | 2/2021 | Mansi ................ G06F 16/9017 |
| 2021/0209119 | A1* | 7/2021 | Claussenelias ....... G06F 16/951 |
| 2021/0343411 | A1 | 11/2021 | Zhang et al. |
| 2021/0345947 | A1 | 11/2021 | Mccarthy et al. |
| 2021/0375480 | A1 | 12/2021 | Mahon et al. |
| 2021/0407682 | A1 | 12/2021 | Crossen et al. |
| 2022/0044328 | A1 | 2/2022 | Ligon |
| 2022/0147865 | A1 | 5/2022 | Naidoo et al. |
| 2022/0230731 | A1 | 7/2022 | Gilutz et al. |
| 2023/0154596 | A1 | 5/2023 | Moustafa et al. |
| 2023/0154608 | A1 | 5/2023 | Gunsola |
| 2023/0178215 | A1 | 6/2023 | Muse et al. |
| 2023/0187085 | A1 | 6/2023 | Hamilton et al. |

FOREIGN PATENT DOCUMENTS

| | | |
|---|---|---|
| WO | 2019/211845 A1 | 11/2019 |
| WO | 2020/229705 A1 | 11/2020 |

OTHER PUBLICATIONS

Li, Debiao and Chen, Siping and Chen, Xiaoqiang and Chou, Chun-An, "Learning and Optimization for Patient-Physician Matching in Specialty Care," 2019, pp. 1-12 (Year: 2019).*

M.-F. Wang, Y.-S. Lu and J.-L. Huang, "Spent: A Successive POI Recommendation Method Using Similarity-Based POI Embedding and Recurrent Neural Network with Temporal Influence," 2019 IEEE International Conference on Big Data and Smart Computing (BigComp), Kyoto, Japan, 2019, pp. 1-8 (Year: 2019).*

Paranjay, Om Adideva, and V. Rajeshkumar. "A neural network aided real-time hospital recommendation system." Indonesian Journal of Science and Technology 5.2 (2020): 217-235. (Year: 2020).*

Non-Final Rejection Mailed on Mar. 25, 2024 for U.S. Appl. No. 17/548,969, 15 page(s).

Advisory Action (PTOL-303) Mailed on Nov. 5, 2024 for U.S. Appl. No. 17/548,969, 3 page(s).

Non-Final Rejection Mailed on Jan. 28, 2025 for U.S. Appl. No. 17/548,969, 15 page(s).

Final Rejection Mailed on Jan. 24, 2024 for U.S. Appl. No. 17/643,030, 36 page(s).

"Emergency Patient Destinations and Hospital Diversion," New York State Department of Health, Bureau of EMS Policy Statement, Jan. 11, 2006, (2 pages), (Article), [Retrieved from the Internet Apr. 8, 2022] <URL: https://www.health.ny.gov/professionals/ems/policy/06-01.htm.

"Investigation of the Interaction Between External Stimulation and Ongoing Brain Activity In Cortical Networks: Analysis, Modeling and Empirical Corroboration," Cordis, European Commission, Apr. 15, 2016, (4 pages), (article), [Retrieved from the Internet Apr. 8, 2022] <URL: https://cordis.europa.eu/article/id/181046-external-stimuli-and-their-effect-on-brain-activity>.

"Online Doctors Available 24/7 Start A Telehealth Visit," Doctor+ On Demand By Included Health, (9 pages), (available online), [Retrieved from the Internet Apr. 8, 2022] <URL: https://doctorondemand.com/>.

Albahri, O.S. et al. "Fault-Tolerant mHealth Framework In The Context of IoT-Based Real-Time Wearable Health Data Sensors," IEEE Access, vol. 7, Apr. 11, 2019, pp. 50052-50080, DOI: 10.1109/ACCESS.2019.2910411.

Coh, Meredith. "Understanding Comas and Consciousness," The Baltimore Sun, Mar. 11, 2015, (11 pages), (article), [Retrieved from the Internet Apr. 8, 2022] <URL: https://www.baltimoresun.com/health/bs-hs-ask-the-expert-consciousness-20150311-story.html>.

Drees, Jackie. "30% of Johns-Hopkins In-Person Visits Will Convert To Telehealth Post Pandemic, CEO Says," Becker's Hospital Review, Jun. 22, 2020, (8 pages), (Article, Online), [Retrieved from the Internet Apr. 8, 2022] <URL: https://www.beckershospitalreview.com/telehealth/30-of-johns hopkins-in-person-visits-will-convert-to-telehealth-post-pandemic-ceo-says.html>.

Galle, Courtney E. "Walk-In Telehealth Visits Improve Access To Care, Wait Times, and Patient Satisfaction in Adult Patients with Non-Emergent Medical Conditions," Doctoral Dissertation, Mar. 2021 (63 pages), Brandman University.

Kucikiene, Domante et al. "The Impact of Music On The Bioelectrical Oscillations of the Brain," Acta Med Lituanica, vol. 25, No. 2, pp. 101-106, (Year: 2018), DOI: 10.6001/actamedica.v25i2.3763, PMID: 30210244.

Masson, Francoise et al. "Epidemiology of Traumatic Comas: A Prospective Population-Based Study," Brain Injury, vol. 17, No. 4, Apr. 2003, pp. 279-293, (Published Online: Jul. 3, 2009), DOI: 10.1080/0269905021000030805. PMID: 12637181.

Serrano, Christina I. et al. "An Exploratory Study Of Patient Acceptance Of Walk-In Telemedicine Services For Minor Conditions," International Journal of Healthcare Information System and Informatics (IJHISI), vol. 4, No. 4, Oct.-Dec. 2009, pp. 1-35.

Vasilevskis, Eduard E. et al. "The Cost of ICU Delirium and Coma in the Intensive Care Unit Patient," Medical Care, vol. 56, No. 10, pp. 890-897, Oct. 2018, DOI: 10.1097/MLR.0000000000000975, PMID: 30179988.

Wong, C. et al. "Incidence, Aetiology, and Outcome of Non-Traumatic Coma: A Population Based Study," Archives of Disease In Childhood, vol. 84, No. 3, pp. 193-199, Mar. 2001, DOI: 10.1136/ads.84.3.193, PMID: 11207161.

Wong, Sze H. et al. "Telehealth and Screening Strategies In The Diagnosis and Management of Glaucoma," Journal of Clinical Medicine, vol. 10, No. 16:3452, Aug. 4, 2021, pp. 1-20, DOI: 10.3390.jcm10163452.

NonFinal Office Action for U.S. Appl. No. 17/643,030, dated Jun. 26, 2023, (31 pages), United States Patent and Trademark Office, US.

Notice of Allowance and Fees Due (PTOL-85) Mailed on May 27, 2025 for U.S. Appl. No. 17/548,969, 9 page(s).

(56)     References Cited

OTHER PUBLICATIONS

Notice of Allowance and Fees Due (PTOL-85) Mailed on Aug. 15, 2025 for U.S. Appl. No. 17/548,969, 3 page(s).

Final Rejection Mailed on Jul. 26, 2024 for U.S. Appl. No. 17/548,969, 19 page(s).

Final Rejection Mailed on Nov. 6, 2025 for U.S. Appl. No. 17/530,241, 31 page(s).

Non-Final Rejection Mailed on Mar. 17, 2025 for U.S. Appl. No. 17/530,241, 26 page(s).

* cited by examiner

400

Identify a service request data object
401

Generate a probabilistic diagnosis data object
402

Determine a predicted redirection score
403

Perform prediction-based actions
404

Identify static operational features
601

Generate a multi-dimensional evaluation vector
602

Generate a generic redirection score
603

403B

Identify diagnostic point-in-time features
701

Identify dynamic operational features
702

Generate a real-time redirection score
703

404A

Prompt a physician to agree to redirection
801

Communicates with a new facility
802

Transmit redirection request to patient
803

MACHINE LEARNING TECHNIQUES FOR ENHANCED REDIRECTION RECOMMENDATION USING REAL-TIME ADJUSTMENT

BACKGROUND

Various embodiments of the present invention address technical challenges related to performing predictive data analysis operations and address the efficiency and reliability shortcomings of various existing predictive data analysis solutions, in accordance with at least some of the techniques described herein.

BRIEF SUMMARY

In general, embodiments of the present invention provide methods, apparatus, systems, computing devices, computing entities, and/or the like for performing predictive data analysis operations. For example, certain embodiments of the present invention utilize systems, methods, and computer program products that perform predictive data analysis operations by generating predicted redirection scores based at least in part on: (i) generic redirection scores that are generated using provider evaluation machine learning models, and (ii) real-time redirection scores that are generated using real-time adjustment machine learning models.

In accordance with one aspect, a method is provided. In one embodiment, the method comprises: identifying a service request data object, wherein the service request data object is associated with a probabilistic diagnosis data object of a plurality of probabilistic diagnosis data objects and one or more diagnostic point-in-time features; identifying a provider data object for the provider profile, wherein the provider data object comprises one or more static operational features associated with the provider profile and one or more dynamic operational features associated with the provider profile; determining, using a provider evaluation machine learning model and based at least in part on the one or more static operational features and the probabilistic diagnosis data object, a generic redirection score for the provider profile; determining, using a real-time adjustment machine learning model and based at least in part on the one or more diagnostic point-in-time features and the one or more dynamic operational features, a real-time redirection score for the provider profile; determining, based at least in part on the generic redirection score and the real-time redirection score, the predicted redirection score for the provider profile; and performing one or more prediction-based actions based at least in part on the predicted redirection score.

In accordance with another aspect, a computer program product is provided. The computer program product may comprise at least one computer-readable storage medium having computer-readable program code portions stored therein, the computer-readable program code portions comprising executable portions configured to: identify a service request data object, wherein the service request data object is associated with a probabilistic diagnosis data object of a plurality of probabilistic diagnosis data objects and one or more diagnostic point-in-time features; identify a provider data object for the provider profile, wherein the provider data object comprises one or more static operational features associated with the provider profile and one or more dynamic operational features associated with the provider profile; determine, using a provider evaluation machine learning model and based at least in part on the one or more static operational features and the probabilistic diagnosis data object, a generic redirection score for the provider profile; determine, using a real-time adjustment machine learning model and based at least in part on the one or more diagnostic point-in-time features and the one or more dynamic operational features, a real-time redirection score for the provider profile; determine, based at least in part on the generic redirection score and the real-time redirection score, the predicted redirection score for the provider profile; and perform one or more prediction-based actions based at least in part on the predicted redirection score.

In accordance with yet another aspect, an apparatus comprising at least one processor and at least one memory including computer program code is provided. In one embodiment, the at least one memory and the computer program code may be configured to, with the processor, cause the apparatus to: identify a service request data object, wherein the service request data object is associated with a probabilistic diagnosis data object of a plurality of probabilistic diagnosis data objects and one or more diagnostic point-in-time features; identify a provider data object for the provider profile, wherein the provider data object comprises one or more static operational features associated with the provider profile and one or more dynamic operational features associated with the provider profile; determine, using a provider evaluation machine learning model and based at least in part on the one or more static operational features and the probabilistic diagnosis data object, a generic redirection score for the provider profile; determine, using a real-time adjustment machine learning model and based at least in part on the one or more diagnostic point-in-time features and the one or more dynamic operational features, a real-time redirection score for the provider profile; determine, based at least in part on the generic redirection score and the real-time redirection score, the predicted redirection score for the provider profile; and perform one or more prediction-based actions based at least in part on the predicted redirection score.

BRIEF DESCRIPTION OF THE DRAWINGS

Figure 1:
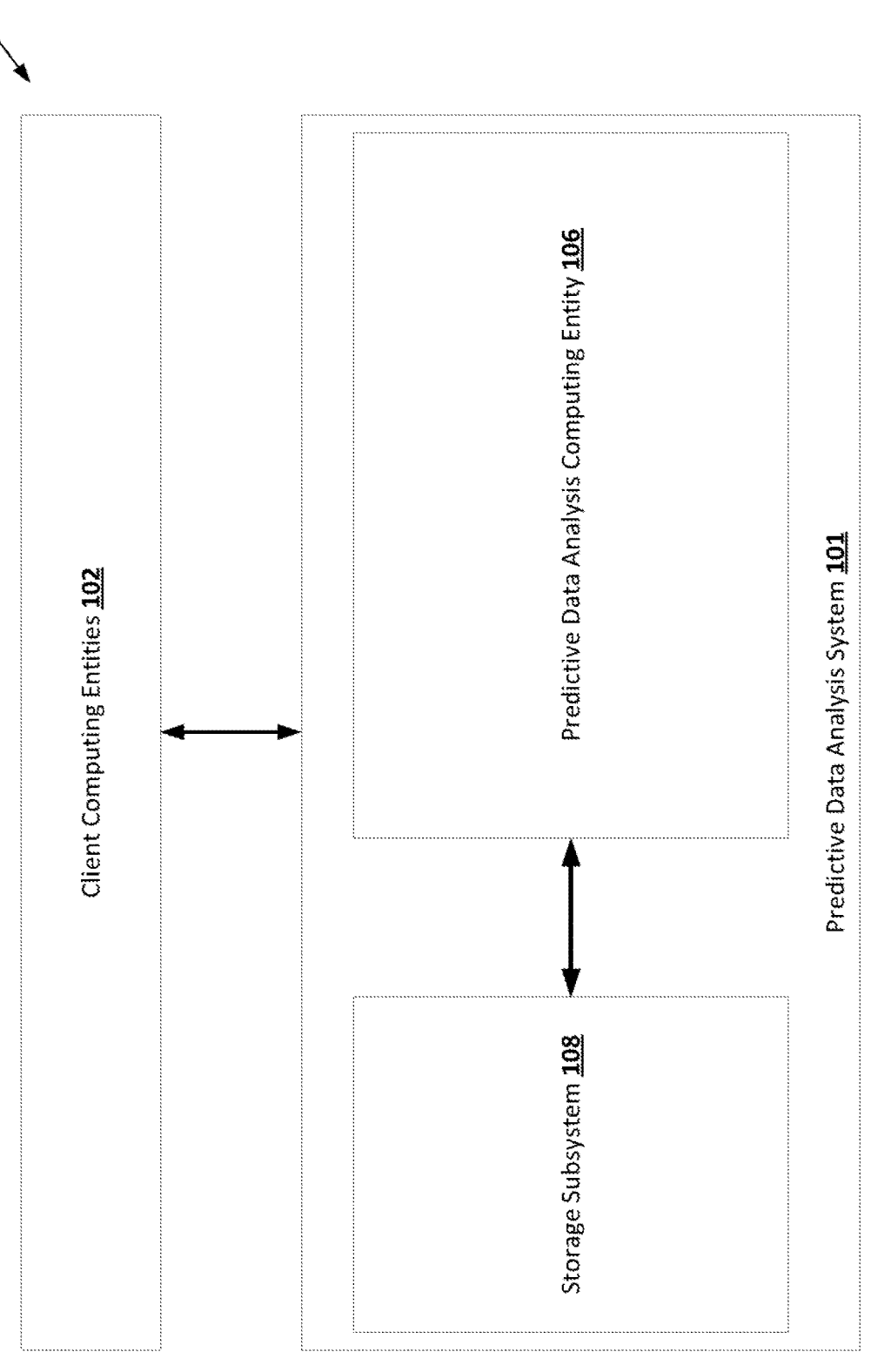

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
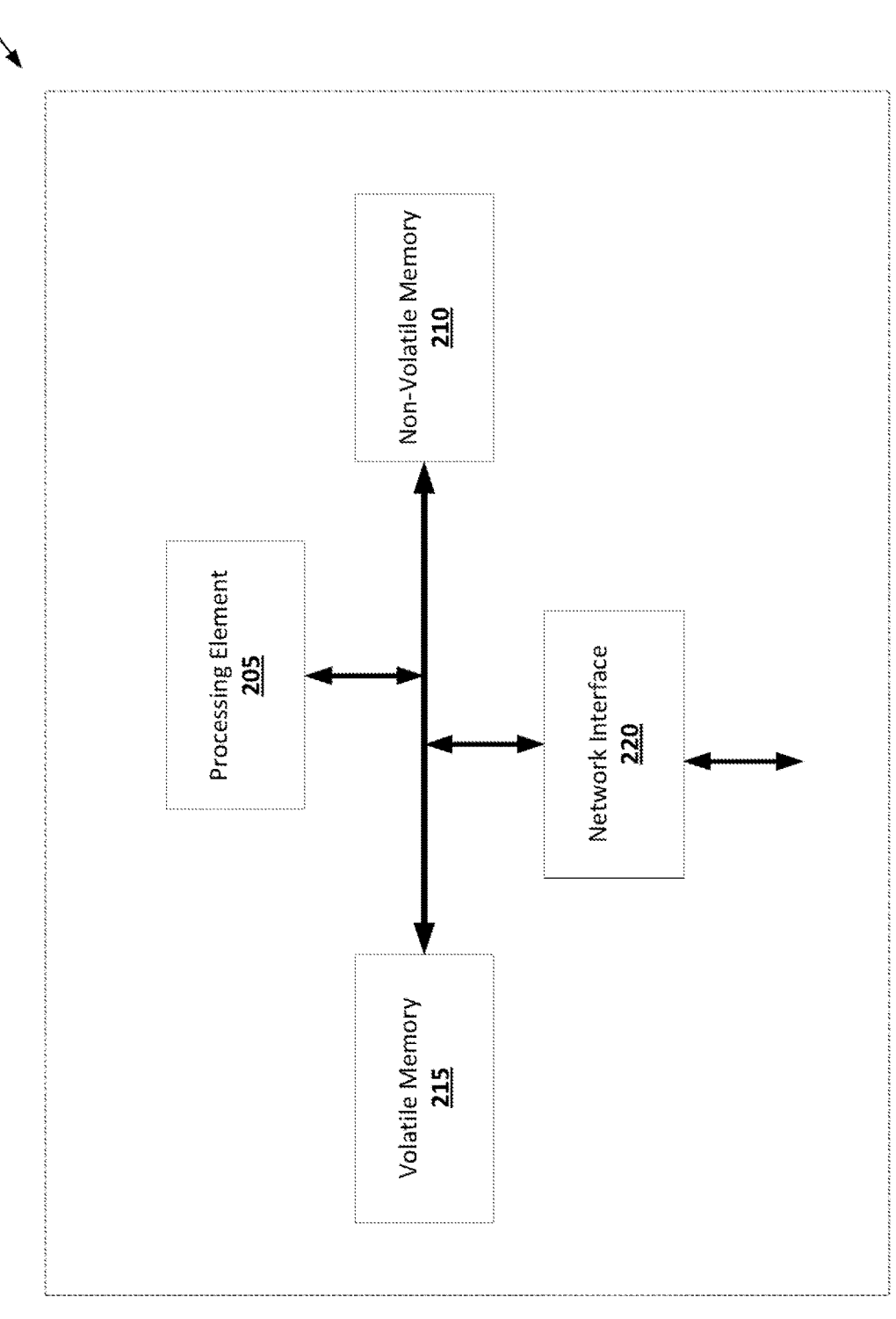

FIG. 2 provides an example predictive data analysis computing entity in accordance with some embodiments discussed herein.

Figure 3:
Figure 3:
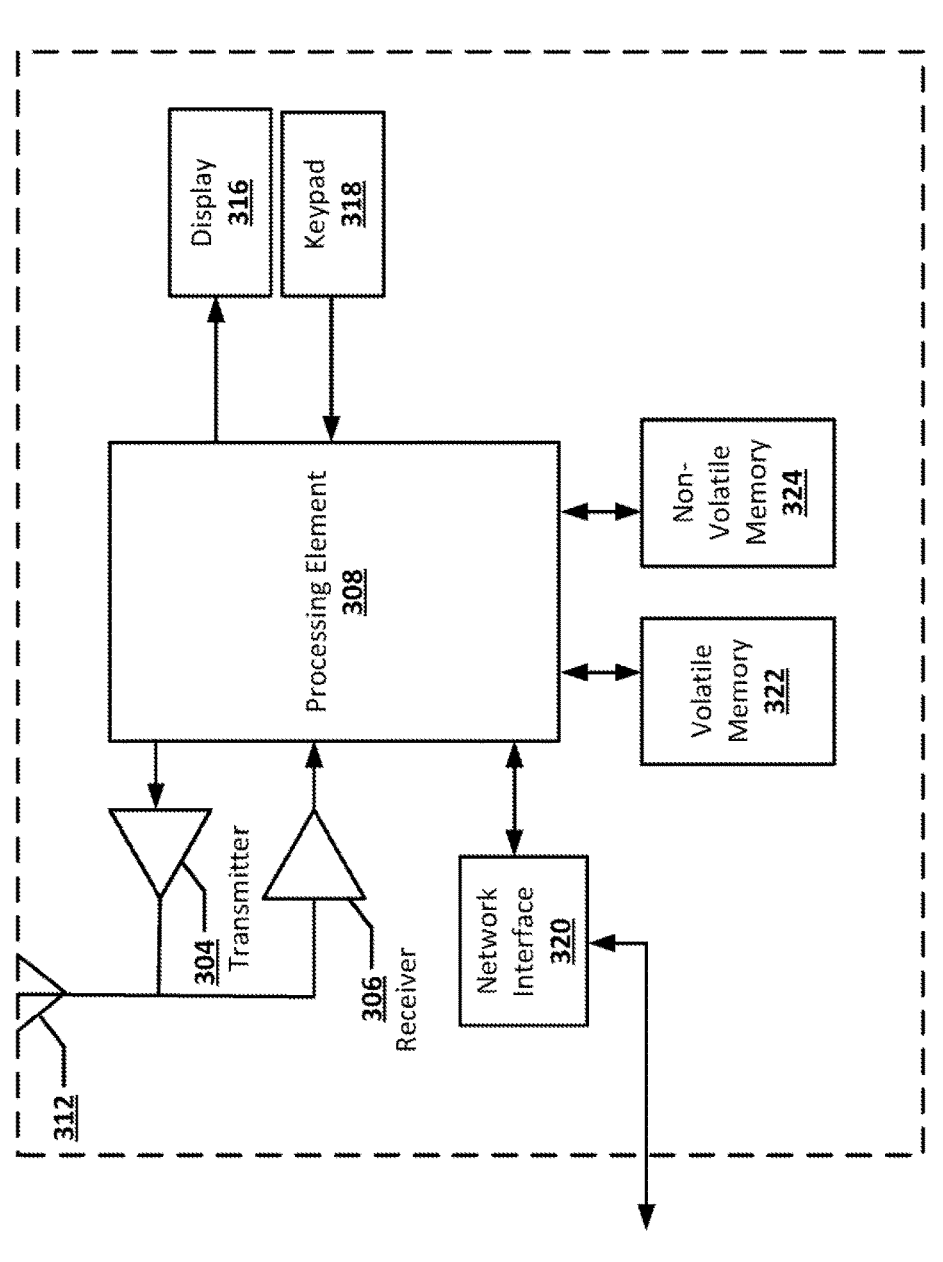

FIG. 3 provides an example client computing entity in accordance with some embodiments discussed herein.

Figure 4:

FIG. 4 is a flowchart diagram of an example process for determining a predicted redirection score for a provider profile with respect to a service request data object in accordance with one or more optimal imbalance adjustment conditions in accordance with some embodiments discussed herein.

Figure 5:
Figure 5:
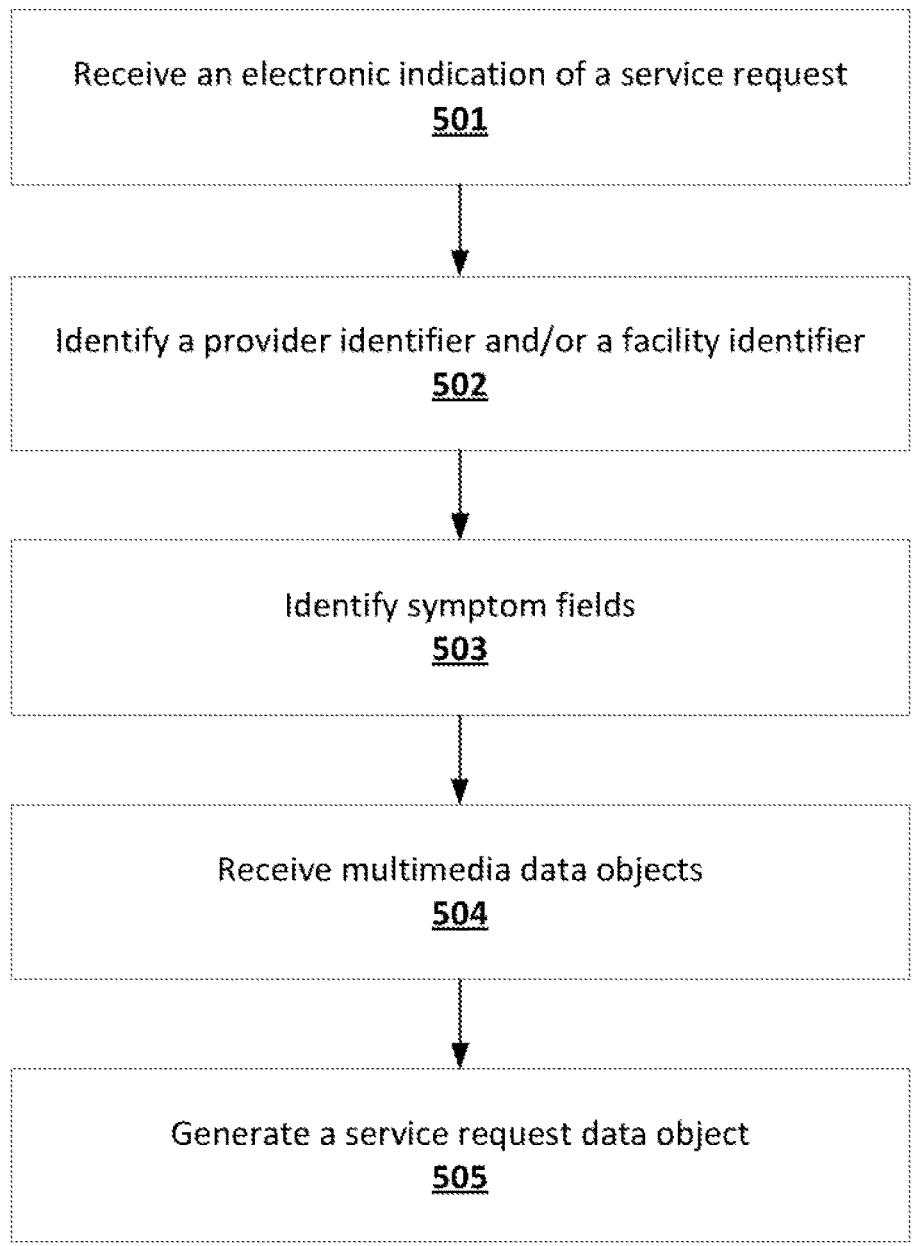

FIG. 5 is a flowchart diagram of an example process for generating a service request data object in accordance with some embodiments discussed herein.

Figure 6:
Figure 6:
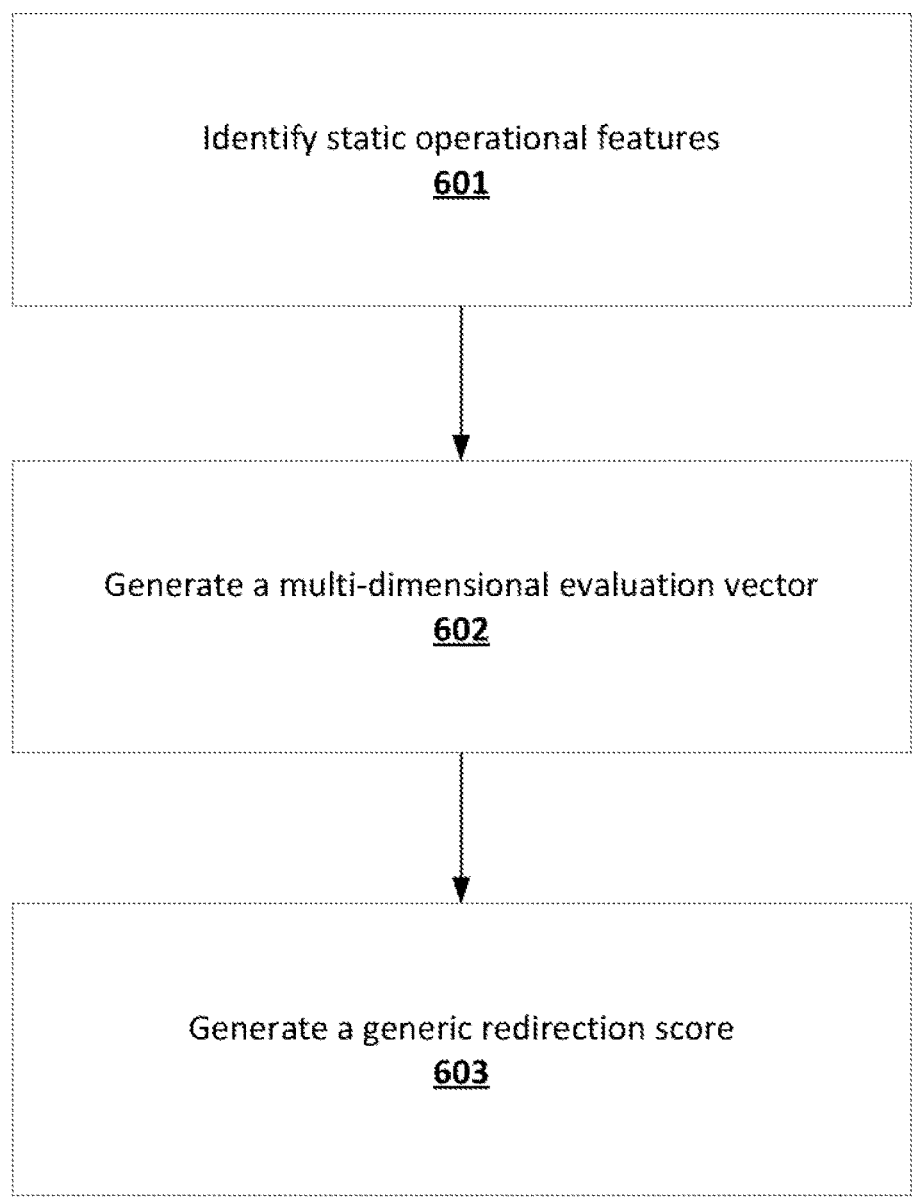

FIG. 6 is a flowchart diagram of an example process for generating a generic redirection score in accordance with some embodiments discussed herein.

Figure 7:
Figure 7:
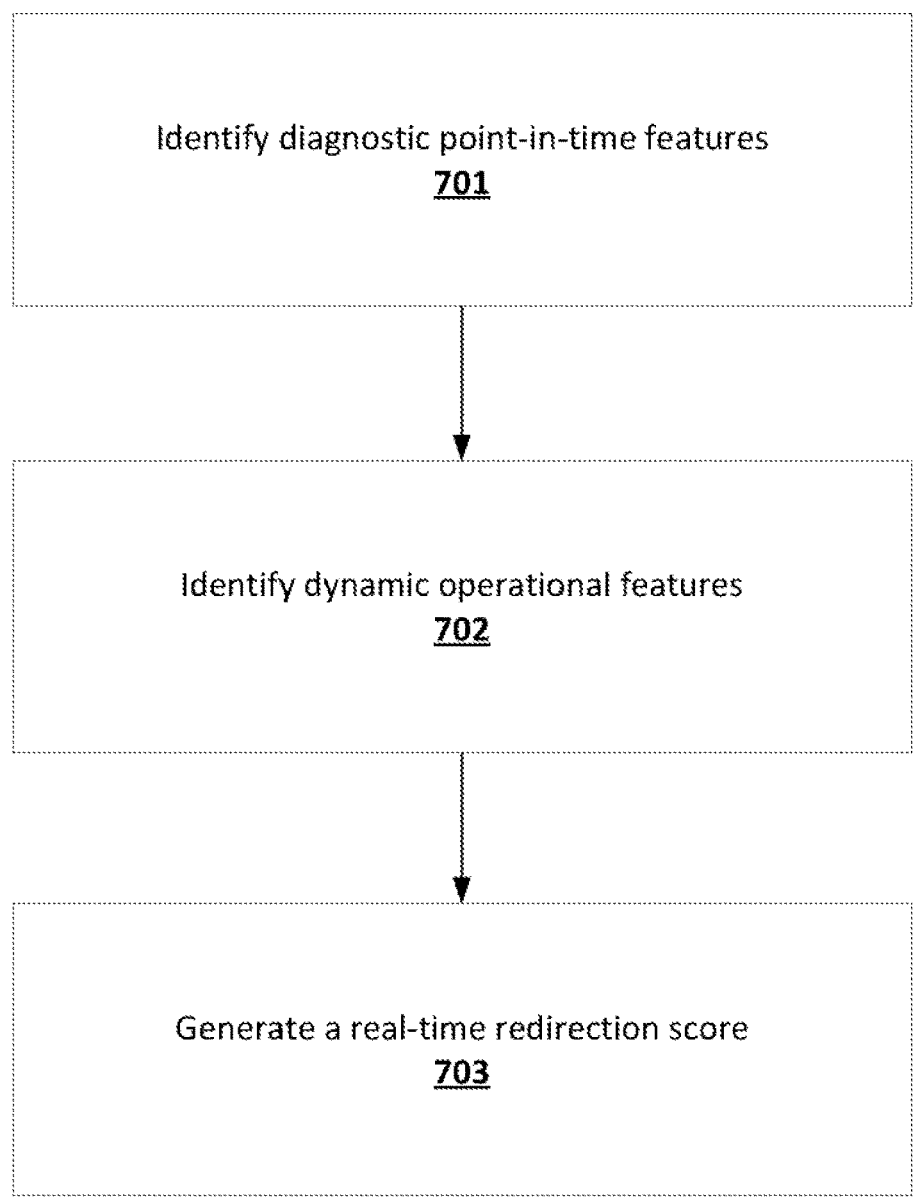

FIG. 7 is a flowchart diagram of an example process for generating a real-time redirection score in accordance with some embodiments discussed herein.

Figure 8:
Figure 8:
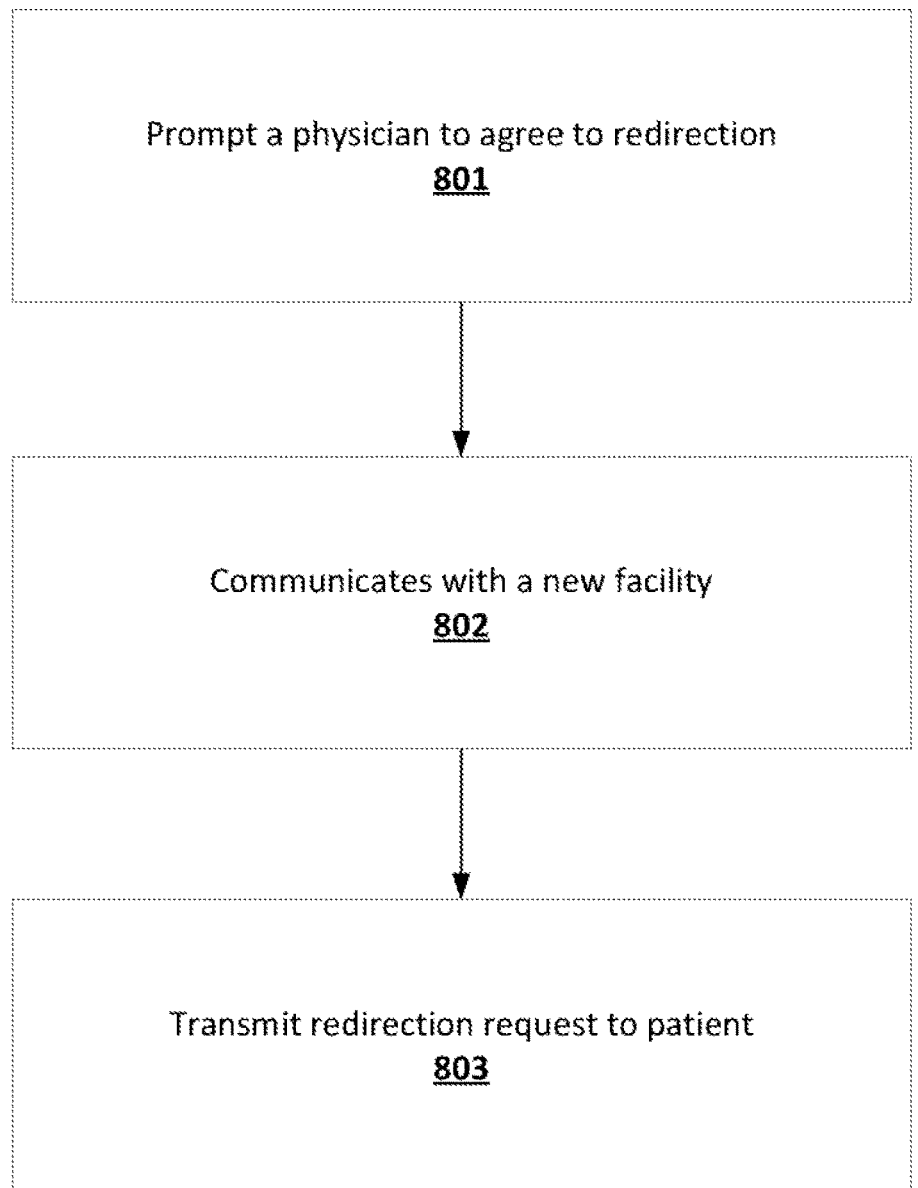

FIG. 8 is a flowchart diagram of an example process for performing one or more prediction-based actions based at least in part on a consultation redirection score in accordance with some embodiments discussed herein.

Figure 9:
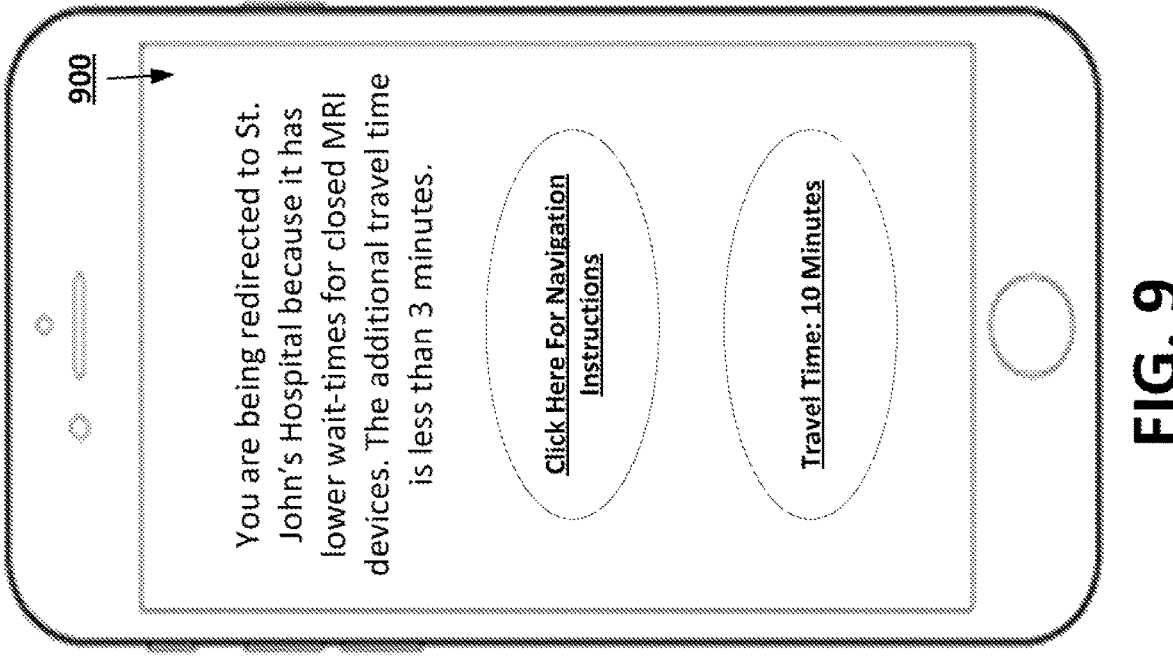

FIG. 9 provides an operational example of a user interface that includes a navigation instruction prompt to an end-user in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used as examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. OVERVIEW AND TECHNICAL IMPROVEMENTS

Various embodiments of the present invention introduce techniques for using the output of a diagnosis prediction machine learning model to generate a redirection score. By using the noted techniques, various embodiments of the present invention enable using pretrained diagnosis prediction machine learning models to generate a redirection score, thus reducing or avoiding the need for computationally expensive operations that are performed to generate diagnosis prediction machine learning models. In this way, various embodiments of the present invention reduce the number of computational operations performed to generate redirection scores, thus improving the computational efficiency of predictive data analysis systems that are configured to generate redirection scores and make important technical contributions to the field of predictive data analysis.

For example, various embodiments of the present invention utilize systems, methods, and computer program products that perform predictive data analysis operations by generating predicted redirection scores based at least in part on: (i) generic redirection scores that are generated using provider evaluation machine learning models, and (ii) real-time redirection scores that are generated using real-time adjustment machine learning models. and (iii) the variable-length classification is processed by a recommendation scoring machine learning model to generate a consultation redirection score for the service request data object. By using the noted techniques, various embodiments of the present invention map the output of a diagnosis prediction machine learning model (e.g., a pretrained diagnosis prediction machine learning model) to a predicted redirection score, thus in some embodiments performing transfer learning (e.g., using the trained parameter data obtained from training one model to perform a predictive task that is different from the defined predictive task of the model) to use a diagnosis prediction machine learning model to generate redirection scores that are different from diagnosis scores generated by the diagnosis prediction machine learning model.

In some embodiments, the diagnosis prediction machine learning model is a pretrained machine learning model whose output with respect to a service request data object is used to generate a dynamic-length classification for the service request data object. In other words, various embodiments of the present invention perform transfer learning on a diagnosis prediction machine learning model by mapping the outputs of the diagnosis prediction machine learning model to a variable-length subset of a plurality of candidate classes. In some embodiments, a diagnosis prediction machine learning model (e.g., a pretrained diagnosis prediction machine learning model or an untrained diagnosis prediction machine learning model that is trained from scratch) is trained as part of an end-to-end machine learning framework that comprises the diagnosis prediction machine learning model, a hybrid diagnosis-provider classification machine learning model, and a recommendation scoring machine learning model.

An exemplary application of various embodiments of the present invention relates to redirecting and/or directing patients to a suitable healthcare facility. The suitable healthcare facility for a patient is determined based at least in part on scoring a plurality of healthcare facilities according to various factors including the patient's diagnostic data, the patient's location, the facility's current wait time, the facility's roster of physicians, the facility's equipment level, and/or the like. A key benefit of various embodiments of the present invention is the improvement of patient care specific to the conditions being experienced by the patient. Efficient orchestration of patients among healthcare facilities improves patient experience and the quality of medical care provided to the patients.

Various embodiments of the present invention may be applied in various forms, such as a customer-facing app, a system for directing ambulances, a scheduling system for a healthcare facility, an orchestration service for multiple healthcare facilities, and/or the like. In some aspects, various embodiments of the present invention are implemented via a redirection agent that interfaces with a diagnostic agent configured to generate probabilistic diagnostic data for a patient.

According to some aspects of various embodiments of the present invention, the following operations are performed: receiving patient diagnostic data generated based at least in part on input by an end user and an indication of an original healthcare facility; generating a real-time suitability score for each of a plurality of healthcare facilities based at least in part on one or more static facility scores mapped to the patient diagnostic data and a dynamic patient match score; selecting a suitable healthcare facility from the plurality of healthcare facilities based at least in part on each real-time suitability score associated with the plurality of healthcare facilities; transmitting a request for approval to the original healthcare facility indicating the suitable healthcare facility; and in accordance with receiving an approval originating from the original healthcare facility, providing a notification to the user indicating the suitable healthcare facility Various aspects of various embodiments of the present invention provide recommendations for suitable healthcare facilities for a patient, and in various aspects, suitable healthcare facilities are recommended based at least in part on their capabilities to adequately treat the patient and the conditions experienced by the patient. Accordingly, diagnostic data for the patient is received and used in various aspects of various embodiments of the present invention. The patient diagnostic data can be probabilistic diagnosis data indicating likelihoods that the patient is experiencing one or more conditions. Other information may also be received in addition to the patient diagnostic data. In many instances, an indication of an original healthcare facility is received. For example, the patient may be en route to an original healthcare facility, and an indication of the original healthcare facility is received for the determination of whether to redirect the patient to a different and a suitable healthcare facility, in accordance with various embodiments of the present invention.

The location of the patient may also be received, such that various embodiments of the present invention may identify and evaluate healthcare facilities within some vicinity of the patient. Other raw data for the patient, healthcare provider data, patient preferences for telehealth, and/or the like may be received, in various aspects of various embodiments of the present invention.

Various healthcare facilities near the location of the patient may be identified and scored for suitability in treating the patient and the conditions experienced by the patient. In particular, each healthcare facility is assigned a suitability score. The suitability score may be based upon some combination of one or more static facility scores and a dynamic match score. The static facility scores may be pre-determined and independent from a user query for redirection (e.g., receiving patient diagnostic data). A healthcare facility is assigned with one or more static facility scores each corresponding to a condition, and a static facility score indicates how well-suited and how well-equipped the healthcare facility is to treat the corresponding condition. Thus, one or more static facility scores that correspond to conditions indicated by the patient diagnostic data are used to determine the suitability score. As discussed, the patient diagnostic data may be probabilistic for one or more conditions, and the one or more static facility scores are weighted accordingly. While the static facility scores are pre-determined, the static facility scores may be periodically updated, in some aspects, to ensure accuracy. Meanwhile, in some embodiments, the dynamic match score factors in the patient and indicates the suitability of the facility for the present situation. For example, the dynamic match score is based at least in part on distance from the patient's current location, the patient diagnostic data, reported real-time pain levels of the patient, and/or the like. One or more static facility scores mapped to the patient diagnostic data and the dynamic match score are then combined in real-time to form the suitability score.

In some embodiments, healthcare facilities may then be evaluated according to their real-time suitability scores. In some aspects, the healthcare facilities are evaluated in a sequential manner in which a first healthcare facility is evaluated, and based at least in part on various conditions, additional healthcare facilities may be evaluated (e.g., closer healthcare facilities). In some other aspects, the healthcare facilities are evaluated in a comparative manner, and a pair of suitability healthcare facilities are selected in order to provide the end user with a choice.

In some embodiments, one or more suitable healthcare facilities are selected and associated with a recommendation score that is based at least in part on the suitability score. For example, a first suitable healthcare facility is 78% recommended, and a second suitable healthcare facility is 22% recommended. In some embodiments, an indication of the suitable healthcare facility is provided to the original healthcare facility, upon which the original healthcare facility may approve or deny the redirection of the patient to the suitable healthcare facility. The indication of the redirection may also be provided to the suitable healthcare facility, with information relating to the patient (e.g., the patient diagnostic data). In some aspects, a communication channel (e.g., electronic handshake) is established between the original healthcare facility and the suitable healthcare facility responsive to approval of redirection by the original healthcare facility, such that data may be communicated between them. In some embodiments, the user may be the only one that receives the redirection suggestions/requests. For example, the user may use a navigation application query to start heading to a facility that is temporarily closed. Because there is no one at the facility to approve the redirection request, the system may generate a redirection suggestion/request to send the user to an alternative facility.

If the original healthcare facility approves the redirection of the patient to the suitable healthcare facility, a notification is provided to the user. The notification indicates and describes the suitable healthcare facility, and may provide navigational directions to the suitable healthcare facility. In some instances, one or more suitable healthcare facilities are indicated to the user, enabling the user to choose between the suitable healthcare facilities. In some aspects, a transportation option (e.g., self-drive, emergency ambulance, scheduled ambulance) is determined and indicated to the patient. One or more suitable healthcare facilities may also be indicated to the user based at least in part on the pain level of the patient. For example, two suitable healthcare facilities are indicated to the user, with the first being indicated as being applicable for high pain levels and the second being indicated as being applicable for lower pain levels.

II. DEFINITIONS

The term "diagnosis prediction machine learning model" may refer to a data construct that is configured to describe parameters, hyper-parameters, and/or defined operations of a model that is configured to process diagnosis input data for a service request data object in order to generate a probabilistic diagnosis data object for the service request data object. In some embodiments, the diagnosis prediction machine learning model is a pretrained machine learning model whose output with respect to a service request data object is used to generate a dynamic-length classification for the service request data object. In other words, various embodiments of the present invention perform transfer learning on a diagnosis prediction machine learning model by mapping the outputs of the diagnosis prediction machine learning model to a variable-length subset of a plurality of candidate classes. In some embodiments, inputs to a diagnosis prediction machine learning model include one or more vectors describing diagnostic input data for a service request data object, while outputs of a diagnosis prediction machine learning model include a vector describing n diagnostic probabilities for m candidate conditions, where those candidate conditions having a threshold-satisfying diagnostic probability may be deemed to be a diagnosed condition described by the vector.

The term "probabilistic diagnosis data object" may refer to a data construct that is configured to describe, for a particular service request data object that is associated with particular diagnosis input data, a set of diagnosed conditions along with a diagnosis probability for each diagnosed condition. For example, a probabilistic diagnosis data object may describe that a service request data object is associated with a diagnosis $D_1$ with the probability $P_1$, a diagnosis $D_2$ with the probability $P_2$, and so on. In some embodiments, the probabilistic diagnosis data object is generated by: (i) obtaining a set of raw diagnosis probabilities for a set of conditions from a diagnosis prediction machine learning model, (ii) normalizing the set of raw diagnosis probabilities to generate the set of diagnosis probabilities for the set of conditions, and (iii) generating the probabilistic diagnosis data object based at least in part on the set of diagnosis probabilities. For example, in some embodiments, the diagnosis prediction machine learning model may include n machine learning components, where each machine learning component is configured to generate a diagnosis probability for a condition of n conditions. In the noted example, the output of each machine learning component may have a different range. Thus, to generate the diagnosis probabilities described by the probabilistic diagnosis data object, the n diagnosis probabilities generated by the n machine learning components may be normalized to have a unified range (e.g., a unified range of [0, 1]), and then the normalized diagnosis probabilities may be used to generate the diagnosis probability data object. For example, the diagnosis probability data object may describe all n normalized diagnosis probabilities, the top m of the normalized diagnosis probabilities (where m may be a predefined value that is smaller than n), and/or those normalized diagnosis probabilities that satisfy (e.g., exceed) a normalized diagnosis probability threshold. In some embodiments, the diagnosis probabilities described by a probabilistic diagnosis data object are determined based at least in part on diagnosis input data associated with a corresponding service request data object, e.g., one or more service fields associated with the service request data object, one or more medical history fields associated with a patient identifier that is associated with the service request data object, and/or the like.

The term "provider data object" may refer to a data construct that is configured to describe one or more features of a provider profile (e.g., a provider profile that describes a particular medical/healthcare facility). Examples of provider features described by a provider data object include static operational features and dynamic operational features, as the two terms are further described below.

The term "static operational feature" may refer to a data construct that is configured to describe a property of a provider profile whose value is not dependent on one or more diagnostic point-in-time features of a service request data object (e.g., is solely dependent on the probabilistic diagnostic data object of the service request data object). For example, for a provider profile that is associated with a medical/healthcare facility, examples of static operational features may include: static operational features that describe equipment levels of the facility to serve a set of probabilistic diagnosis data objects, static operational features that describe expertise/training levels of the facility to serve a set of probabilistic diagnosis data objects, static operational features that describe whether facilities near the target facility have expertise/training needed to serve a set of probabilistic diagnostic data objects, static operational features that describe the current backlog of physicians best equipped to treat a set of probabilistic diagnostic data objects, static operational features that describe empirical records of successful treatments at the facility with respect to a set of probabilistic diagnosis data objects, and/or the like. As clear, each of the noted exemplary static operational features maps a probabilistic diagnosis data object to a feature value without regard to any diagnostic point-in-time feature that describes a real-time condition of a patient a time of a corresponding service request data object.

The term "predicted redirection score" may refer to a data construct that is configured to describe a predicted measure of suitability of a provider profile with a service request data object. For example, a predicted redirection score for a provider profile that is associated with a medical/healthcare facility may describe an estimated/computed prediction about whether the facility is suitable for redirecting a patient associated with the service request data object based at least in part on a particular condition of the patient, one or more diagnostic point-in-time features of the patient, and one or more dynamic operational features of the facility. In some embodiments, the predicted redirection score for a provider profile is generated based at least in part on at least two components: a generic redirection score and a real-time redirection score, as the two terms are further described below.

The term "generic redirection score" may refer to a data construct that is configured to describe a predicted measure of suitability of a provider profile with a service request data object that is determined based at least in part on the probabilistic diagnosis data object that is associated with the service request data object and one or more static operational features of the provider profile. For example, the generic redirection score for a provider profile that is associated with a medical/healthcare facility may be a "facility score" that describes how suitable the facility is for addressing a probabilistic diagnosis data that is associated with the corresponding service request data object. In some embodiments, given a set of probabilistic diagnosis data objects each having n probabilistic diagnosis values associated with n medical diagnosis categories, a target facility is associated with a generic redirection score for each unique combination of the n probabilistic diagnosis values. In some embodiments, determining a generic redirection score for a provider profile comprises: determining, based at least in part on an output of processing one or more static operational features of the provider profile using a provider evaluation machine learning model, a multi-dimensional evaluation vector for the provider profile that describes, for each provider evaluation dimension of a plurality of provider evaluation dimensions, a dimensional evaluation score; and determining, based at least in part on each dimensional evaluation score, the generic redirection score.

The term "provider evaluation machine learning model" may refer to a data construct that is configured to describe parameters, hyper-parameters, and/or defined operations of a model that is configured to process one or more static operational features associated with a provider profile to determine the multi-dimensional evaluation vector for the provider profile with respect to a condition characterized by a particular probabilistic diagnosis data object (e.g., a particular probabilistic diagnosis data object whose relevant feature data are provided as input data to the provider evaluation machine learning model). In some embodiments, the provider evaluation machine learning model comprises a statical inference sub-model that is configured to determine, based at least in part on historical statistical data associated with a provider profile, a set of dimensional evaluation scores for a set of provider evaluation dimensions. In some embodiments, the provider evaluation machine learning model comprises a regression sub-model that is configured to determine, based at least in part on one or more feature data associated with a provider profile, a set of dimensional evaluation scores for a set of provider evaluation dimensions. An example of such a trained machine learning model is a multi-output regression model, where each regression output of the model is a respective dimensional evaluation score. In some embodiments, given a provider evaluation machine learning model that is configured to determine multi-dimensional evaluation vectors each having n dimensional evaluation scores, for each multi-dimensional evaluation vector that is associated with a particular provider profile: (i) a subset of the n dimensional evaluation scores are determined using the statistical inference sub-model of the provider evaluation machine learning model and based at least in part on statistical inferences performed across historical operational data associated with the provider profile, (ii) a subset of the n dimensional evaluation scores are determined using the regression sub-model and based at least in part on regression outputs determined based at least in part on engineered features of the provider profile (e.g., engineered features describing a population density of a locality of the provider profile, a population density of a locality of the provider profile and a proximate provider density of the locality, and/or the like), and/or (iii) a subset of the n dimensional evaluation scores are determined by aggregating/combining: (i) first evaluation components determined using the statistical inference sub-model of the provider evaluation machine learning model and based at least in part on statistical inferences performed across historical operational data associated with the provider profile, and (ii) second evaluation components determined using the regression sub-model and based at least in part on regression outputs determined based at least in part on engineered features of the provider profile. In some embodiments, inputs to a provider evaluation machine learning model include at least one of a vector determined based at least in part on one or more statistical operational features of an input provider profile and a vector determined based at least in part on a probabilistic diagnosis data object of an input service request data object. In some embodiments, outputs of a provider evaluation machine learning model include a vector describing the multi-dimensional evaluation vector.

The term "multi-dimensional evaluation vector" may refer to a data construct that is configured to describe a vector that includes a set of dimensional evaluation scores, where each dimensional evaluation score may describe a predicted degree of correspondence of a particular provider profile that is associated with the multi-dimensional evaluation vector with a provider evaluation dimension that is associated with the dimensional evaluation score. For example, a multi-dimensional evaluation vector may include at least one of the following dimensional evaluation scores: a first evaluation dimension score associated with a provider equipment evaluation dimension that describes a degree of equipment availability of the provider profile to address a particular condition associated with a corresponding probabilistic diagnosis data object, a second evaluation dimension score associated with a provider experience evaluation dimension that describes a degree of experience/training of staff of the provider profile to address a particular condition associated with a corresponding probabilistic diagnosis data object, a third evaluation dimension score associated with a relative experience evaluation dimension that describes an expertise measure of one or more geographically proximate provider profiles associated with the provider profile to address a particular condition associated with a corresponding probabilistic diagnosis data object, a fourth evaluation dimension score associated with an overall wait-time evaluation dimension that describes an overall wait-time measure for the provider profile, a fifth evaluation dimension score associated with a backlog evaluation dimension that describes a current physician backlog measure of the provider profile for physician(s) that are equipped to treat a particular condition associated with a corresponding probabilistic diagnosis data object, a sixth evaluation dimension score associated with a provider success evaluation dimension that describes a successful treatment record measure of the provider profile of a particular condition associated with a corresponding probabilistic diagnosis data object, and/or the like.

The term "real-time redirection score" may refer to a data construct that is configured to describe a predicted measure of suitability of a provider profile to address a service request data object that is determined based at least in part on one or more diagnostic point-in-time features of the service request data object and one or more dynamic operational features of the provider profile. In some embodiments, a real-time redirection score is a "point-in-time score" that indicates how much a given medical/healthcare facility is an optimal facility for a given patient based at least in part on real-time features of the patient that are not described by the probabilistic diagnosis data object for the patient, such as the patient's real-time location, diagnostic acuity, reported pain level, and/or other administrative factors of the patient. The real-time redirection score may be used to adjust a generic prediction score based at least in part on real-time considerations and augment the generic prediction scores by considering unique patients' details that are not captured by the probabilistic diagnostic data object that is associated with the patient.

The term "diagnostic point-in-time feature" may refer to a data construct that is configured to describe a property of a corresponding service request data object that is not described by the probabilistic diagnosis data object for the service request data object. As the probabilistic diagnosis data object may be associated with a unique combination of probabilistic diagnosis values that define a unique combination, it can in some embodiments be thought of defining of features associated with a "generic patient" of the unique combination. However, other properties of the patient not described by the probabilistic diagnosis data object may be relevant to predicted redirection score generation processes described herein. Examples of such properties include patient's location, patient's pain acuity, patient's level of pain, and/or the like. Accordingly, examples of diagnostic point-in-time features include one or more of real-time location, real-time condition severity, real-time acuity, and/or the like.

The term "dynamic operational feature" may refer to a data construct that is configured to describe a property of a provider profile whose corresponding feature value depends on one or more diagnostic point-in-time features of a service request data object. Examples of dynamic operational features include a distance feature that describes a relative distance of a facility to a real-time location of a patient that is associated with a service request data object, a severity level suitability feature that describes suitability of a facility to handle a real-time condition severity of a patient that is associated with a service request data object, a pain level suitability feature that describes suitability of a facility to handle a real-time pain severity of a patient that is associated with a service request data object, an administrative suitability feature that describes suitability of a facility to handle an administrative need of a patient that is associated with a service request data object, and/or the like.

The term "real-time adjustment machine learning model" may refer to a data construct that is configured to describe parameters, hyper-parameters, and/or defined operations of a model that is configured to process diagnostic point-in-time features for a service request data object and one or more dynamic operational features of a provider profile to determine a real-time redirection score for the provider profile with respect to the service request data object. In some embodiments, the real-time adjustment machine learning model comprises a recurrent neural network machine learning model, the recurrent neural network machine learning model is configured to sequentially process a sequence of model inputs via a sequence of timesteps until a terminal timestep that is associated with a redirection score expectation time, and the real-time redirection score is determined based at least in part on a hidden state value for the terminal timestep. In some embodiments, the real-time adjustment machine learning model comprises a recurrent neural network machine learning model, where the recurrent neural network machine learning model is configured to, at each timestep, process model input data for the timestep and a hidden state value of a preceding timestep of the noted timestep (or, for the initial timestep, a default hidden state value) to generate a hidden state value for the noted timestep. In some embodiments, during each nth timestep, the model input data for the nth timestep include an nth diagnostic point-in-time features of a sequence of m diagnostic point-in-time features of a service request data object and an nth dynamic operational feature of a sequence of m dynamic operational features. In some embodiments, the n timesteps may be a value that is less than or equal to m, because in some embodiments the model output is expected at a redirection score expectation time (e.g., within 30 seconds) and thus the processing needs to stop before processing all of the sequence if the threshold time is reached. In some embodiments, the real-time redirection score is determined based at least in part on a hidden state value for the terminal timestep of the recurrent neural network machine learning model. In some embodiments, inputs to the real-time adjustment machine learning model include vectors each describing model inputs of the real-time adjustment machine learning model for a timestep, while outputs of the real-time adjustment machine learning model include vectors describing the described hidden state values of the real-time adjustment machine learning model.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a scripting language, a database query or search language, and/or a report writing language. In one or more example embodiments, a software component comprising instructions in one of the foregoing examples of programming languages may be executed directly by an operating system or other software components without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is processing a request for redirecting a patient to a new facility if such a facility is better suited than a target facility for addressing patient needs.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention introduce techniques for using the output of a diagnosis prediction machine learning model to generate a redirection score. By using the noted techniques, various embodiments of the present invention enable using pretrained diagnosis prediction machine learning models to generate a redirection score, thus reducing or avoiding the need for computationally expensive operations that are performed to generate diagnosis prediction machine learning models. In this way, various embodiments of the present invention reduce the number of computational operations performed to generate redirection scores, thus improving the computational efficiency of predictive data analysis systems that are configured to generate redirection scores and make important technical contributions to the field of predictive data analysis.

FIG. 4 is a flowchart diagram of an example process 400 for determining a predicted redirection score for a provider profile. Via the various steps/operations of the process 400, a predictive data analysis computing entity 106 can use a provider evaluation machine learning model and a real-time adjustment machine learning model to map the output of a diagnosis prediction machine learning model (e.g., a pretrained diagnosis prediction machine learning model) to a predicted redirection score, thus in some embodiments performing transfer learning to use a diagnosis prediction machine learning model to generate predicted redirection scores that are different from diagnosis scores generated by the diagnosis prediction machine learning model.

The process 400 begins at step/operation 401 when the predictive data analysis computing entity 106 identifies the service request data object. In some embodiments, the service request data object describes diagnosis input data (e.g., symptom data, medical history data, and/or the like) associated with a service request (e.g., a request for medical services), a patient/service recipient identifier for the service request, a provider (e.g., medical provider) identifier for the service request, a medical facility identifier for the service request, one or more multimedia objects associated with the service request.

In some embodiments, step/operation 401 may be performed in accordance with the process that is depicted in FIG. 5. The process that is depicted in FIG. 5 begins at step/operation 501 when the predictive data analysis computing entity 106 receives an electronic indication that a service (e.g., a healthcare service) is requested. The electronic indication may be generated in response to a medical appointment creation request that is generated using a smartphone or desktop application, in response to a telephone call, and/or the like.

At step/operation 502, the predictive data analysis computing entity 106 identifies a provider identifier and/or a facility identifier for the service request. In some embodiments, the provider identifier and/or the facility identifier may be explicitly provided as part of the service request. In some embodiments, the provider identifier and/or the facility identifier may be inferred based at least in part on patient preference data maintained by the predictive data analysis computing entity 106.

At step/operation 503, the predictive data analysis computing entity 106 identifies one or more symptom fields associated with a patient identifier for the service request. A patient may use external third-party application provider applications or payer applications to enter symptoms (e.g., by using a drop-down selection, free-form text, question-and-answer decision trees, and/or in other manners). In some embodiments, if the service request includes free-form text, the service request is processed in accordance with a natural language processing machine learning model in order to detect one or more diagnosis codes, one or more symptom codes, and/or one or more procedure codes in the free form text. In some embodiments, the one or more symptom fields are identified by a process that includes at least the following steps/operations: (i) for each symptom of a plurality of candidate symptoms, generating a symptom presence score that is generated by the natural language processing machine learning model via processing the free-form text using the natural language processing machine learning model and a symptom historical score that is generated by a relative occurrence frequency of the symptom within electronic health record (EHR) data of the patient identifier, (ii) for each symptom, generating a combined symptom score based at least in part on the symptom presence score for the symptom and historical symptom score for the symptom, and (iii) determining the one or more symptom fields for the patient identifier based at least in part on each symptom having a threshold-satisfying combined symptom score.

At step/operation 504, the predictive data analysis computing entity 106 optionally receives one or more multimedia data objects (e.g., videos, photographs, Digital Imaging and Communications in Medicine (DICOM) files and/or the like) for the service request. Examples of multi-media data objects include a magnetic resonance imaging (MRI) report, a computed tomography (CT) scan, a colonoscopy image, one or more DICOM files, or other professionally-derived images. The multimedia data objects may be uploaded by an end-user that is generating the service request.

At step/operation 505, the predictive data analysis computing entity 106 determines the service request data object. In some embodiments, the predictive data analysis computing entity 106 combines at least one of the provider identifiers, the facility identifier, the symptom fields, and the multimedia data objects in order to generate the service request data object. In some embodiments, the service request data object describes diagnostic input data associated with the service request data object, such as one or more symptom fields associated with the service request data object, one or more medical history fields associated with the service request data object, and/or the like.

Returning to FIG. 4, at step/operation 402, the predictive data analysis computing entity 106 generates a probabilistic diagnosis data object for the service request data object. In some embodiments, the predictive data analysis computing entity 106 loads diagnosis input data associated with the service request data object into a diagnostic agent (e.g., a cloud-based diagnosis agent), and obtains the probabilistic diagnosis data object from the diagnostic agent in response to the loading of the diagnosis input data.

In some embodiments, a probabilistic diagnosis data object describes, for a particular service request data object that is associated with a particular diagnosis input data, a set of diagnosed conditions along with a diagnosis probability for each diagnosed condition. For example, a probabilistic diagnosis data object may describe that a service request data object is associated with a diagnosis $D_1$ with the probability $P_1$, a diagnosis $D_2$ with the probability $P_2$, and so on. In some embodiments, the probabilistic diagnosis data object is generated by: (i) obtaining a set of raw diagnosis probabilities for a set of conditions from a diagnosis prediction machine learning model, (ii) normalizing the set of raw diagnosis probabilities to generate the set of diagnosis probabilities for the set of conditions, and (iii) generating the probabilistic diagnosis data object based at least in part on the set of diagnosis probabilities.

In some embodiments, the probabilistic diagnosis data object for a service request data object is generated by a diagnosis prediction machine learning model based at least in part on diagnosis input data associated with the service request data object. The diagnosis prediction machine learning model may be configured to process diagnosis input data for a service request data object in order to generate a probabilistic diagnosis data object for the service request data object. In some embodiments, the diagnosis prediction machine learning model is a pretrained machine learning model whose output with respect to a service request data object is used to generate a dynamic-length classification for the service request data object. In other words, various embodiments of the present invention perform transfer learning on a diagnosis prediction machine learning model by mapping the outputs of the diagnosis prediction machine learning model to a variable-length subset of a plurality of candidate classes.

In some embodiments, the diagnosis prediction machine learning model may include n machine learning components, where each machine learning component is configured to generate a diagnosis probability for each condition of n conditions. In the noted example, the output of each machine learning component may have a different range. Thus, to generate the diagnosis probabilities described by the probabilistic diagnosis data object, the n diagnosis probabilities generated by the n machine learning components may be normalized to have a unified range (e.g., a unified range of [0, 1]), and then the normalized diagnosis probabilities may be used to generate the diagnosis probability data object. For example, the diagnosis probability data object may describe all n normalized diagnosis probabilities, the top m of the normalized diagnosis probabilities (where m may be a predefined value that is smaller than n), and/or those normalized diagnosis probabilities that satisfy (e.g., exceed) a normalized diagnosis probability threshold. In some embodiments, the diagnosis probabilities described by a probabilistic diagnosis data object are determined based at least in part on diagnosis input data associated with a corresponding service request data object, e.g., one or more service fields associated with the service request data object, one or more medical history fields associated with a patient identifier that is associated with the service request data object, and/or the like.

In some embodiments, a diagnosis prediction machine learning model (e.g., a pretrained diagnosis prediction machine learning model or an untrained diagnosis prediction machine learning model that is trained from scratch) is trained as part of an end-to-end machine learning framework that comprises the diagnosis prediction machine learning model, a hybrid diagnosis-provider classification machine learning model, and a recommendation scoring machine learning model, wherein the end-to-end machine learning framework may operate using at least the following steps/operations: (i) a service request data object is processed by the diagnosis prediction machine learning model to generate a probabilistic diagnosis data object, (ii) the probabilistic diagnosis data object is processed by the hybrid diagnosis-provider classification machine learning model to generate a variable-length classification for the service request data object, and (iii) the variable-length classification is processed by the recommendation scoring machine learning model to generate a consultation redirection score for the service request data object.

In some embodiments, during training of the end-to-end machine learning framework, any trainable parameters of the diagnosis prediction machine learning model, the hybrid diagnosis-provider classification machine learning model, and the recommendation scoring machine learning model are trained based at least in part on inferred consultation redirection scores for service request data objects and ground-truth consultation outcomes for the service request data objects as determined based at least in part on historical data associated with the service request data object. For example, if an inferred consultation redirection score for a service request data object is 0.4 but the ground-truth consultation outcome for the service request data object describes an affirmative consultation outcome (e.g., describes that the patient was scheduled for a consult in response to the service request data object), then a deviation measure of $1-0.4=0.6$ may be used as part of an error measure that is used to train the end-to-end machine learning framework by updating any trainable parameters of the diagnosis prediction machine learning model, the hybrid diagnosis-provider classification machine learning model, and the recommendation scoring machine learning model in a manner that is configured to optimize the error measure.

At step/operation 403, the predictive data analysis computing entity 106 determines the predicted redirection score for the provider profile based at least in part on a provider data object for the provider profile and a real-time diagnosis profile that comprises the probabilistic diagnosis data object. A predicted redirection score may describe a predicted measure of suitability of a provider profile with a service request data object. For example, a predicted redirection score for a provider profile that is associated with a medical/healthcare facility may describe an estimated/computed prediction about whether the facility (e.g., an originally-intended facility) is suitable for redirecting a patient associated with the service request data object based at least in part on a particular condition of the patient, one or more diagnostic point-in-time features of the patient, and one or more dynamic operational features of the facility. In some embodiments, the predicted redirection score for a provider profile is generated based at least in part on at least two components: a generic redirection score and a real-time redirection score. Examples of predicted redirection scores may include a prediction redirection score that describes that an originally-intended facility is an appropriate facility for a user and thus no redirection is needed.

A generic redirection score may describe a predicted measure of suitability of a provider profile with a service request data object that is determined based at least in part on the probabilistic diagnosis data object that is associated with the service request data object and one or more static operational features of the provider profile. For example, the generic redirection score for a provider profile that is associated with a medical/healthcare facility may be a "facility score" that describes how suitable the facility is for addressing a probabilistic diagnosis data that is associated with the corresponding service request data object. In some embodiments, given a set of probabilistic diagnosis data objects each having n probabilistic diagnosis values associated with n medical diagnosis categories, a target facility is associated with a generic redirection score for each unique combination of the n probabilistic diagnosis values. In some embodiments, determining a generic redirection score for a provider profile comprises: determining, based at least in part on an output of processing one or more static operational features of the provider profile using a provider evaluation machine learning model, a multi-dimensional evaluation vector for the provider profile that describes, for each provider evaluation dimension of a plurality of provider evaluation dimensions, a dimensional evaluation score; and determining, based at least in part on each dimensional evaluation score, the generic redirection score.

In some embodiments, a generic redirection score for a provider profile may be determined using the steps/operations of the process 403A that is depicted in FIG. 6. The process 403A begins at step/operation 601 when the predictive data analysis computing entity 106 identifies one or more static operational features of the provider profile. A static operational feature may describe a property of a provider profile whose value is not dependent on one or more diagnostic point-in-time features of a service request data object (e.g., is solely dependent on the probabilistic diagnostic data object of the service request data object). For example, for a provider profile that is associated with a medical/healthcare facility, examples of static operational features may include: static operational features that describe equipment levels of the facility to serve a set of probabilistic diagnosis data objects, static operational features that describe expertise/training levels of the facility to serve a set of probabilistic diagnosis data objects, static operational features that describe whether facilities near the target facility have expertise/training needed to serve a set of probabilistic diagnostic data objects, static operational features that describe the current backlog of physicians best equipped to treat a set of probabilistic diagnostic data objects, static operational features that describe empirical records of successful treatments at the facility with respect to a set of probabilistic diagnosis data objects, and/or the like. In some embodiments, each of the noted exemplary static operational features maps a probabilistic diagnosis data object to a feature value without regard to any diagnostic point-in-time feature that describes a real-time condition of a patient at a time of a corresponding service request data object.

In some embodiments, static operational features are extracted at an asynchronous time (e.g., periodically). For example, in some embodiments, at an asynchronous provider data retrieval time, asynchronous provider feature data associated with a provider profile are retrieved, and one or more static operational features are then determined based at least in part on the asynchronous provider feature data. In some embodiments, static operational features are extracted at a request time associated with a time when a service request data object is received from a client computing entity that is associated with a request-initiating user profile. For example, in some embodiments, at an asynchronous provider data retrieval time, asynchronous provider feature data associated with a provider profile are retrieved, and one or more static operational features are then determined based at least in part on the asynchronous provider feature data.

At step/operation 602, the predictive data analysis computing entity 106 processes the one or more static operational features of the provider profile using a provider evaluation machine learning model to generate a multi-dimensional evaluation vector. In some embodiments, the provider evaluation machine learning model is a machine learning model that is configured to process the one or more static operational features of a provider profile to determine a multi-dimensional evaluation vector for the provider profile with respect to a target probabilistic diagnosis data object that is associated with the machine learning model. In some embodiments, the provider evaluation machine learning model is a machine learning model that is configured to process the one or more static operational features of a provider profile and one or more diagnosis features extracted from an input probabilistic diagnosis data object to determine a multi-dimensional evaluation vector for the provider profile with respect to input probabilistic diagnosis data object of a set of target probabilistic diagnosis data objects that are associated with the machine learning model.

In some embodiments, a multi-dimensional evaluation vector is a vector that includes a set of dimensional evaluation scores, where each dimensional evaluation score may describe a predicted degree of correspondence of a particular provider profile that is associated with the multi-dimensional evaluation vector with a provider evaluation dimension that is associated with the dimensional evaluation score. For example, a multi-dimensional evaluation vector may include at least one of the following dimensional evaluation scores: a first evaluation dimension score associated with a provider equipment evaluation dimension that describes a degree of equipment availability of the provider profile to address a particular condition associated with a corresponding probabilistic diagnosis data object, a second evaluation dimension score associated with a provider experience evaluation dimension that describes a degree of experience/training of staff of the provider profile to address a particular condition associated with a corresponding probabilistic diagnosis data object, a third evaluation dimension score associated with a relative experience evaluation dimension that describes an expertise measure of one or more geographically proximate provider profiles associated with the provider profile to address a particular condition associated with a corresponding probabilistic diagnosis data object, a fourth evaluation dimension score associated with an overall wait-time evaluation dimension that describes an overall wait-time measure for the provider profile, a fifth evaluation dimension score associated with a backlog evaluation dimension that describes a current physician backlog measure of the provider profile for physician(s) that are equipped to treat a particular condition associated with a corresponding probabilistic diagnosis data object, a sixth evaluation dimension score associated with a provider success evaluation dimension that describes a successful treatment record measure of the provider profile of a particular condition associated with a corresponding probabilistic diagnosis data object, and/or the like.

In some embodiments, a provider evaluation machine learning model is a machine learning model that is configured to process one or more static operational features associated with a provider profile to determine the multi-dimensional evaluation vector for the provider profile with respect to a condition characterized by a particular probabilistic diagnosis data object (e.g., a particular probabilistic diagnosis data object whose relevant feature data are provided as input data to the provider evaluation machine learning model). In some embodiments, the provider evaluation machine learning model comprises a statical inference sub-model that is configured to determine, based at least in part on historical statistical data associated with a provider profile, a set of dimensional evaluation scores for a set of provider evaluation dimensions. In some embodiments, the provider evaluation machine learning model comprises a regression sub-model that is configured to determine, based at least in part on one or more feature data associated with a provider profile, a set of dimensional evaluation scores for a set of provider evaluation dimensions. An example of such a trained machine learning model is a multi-output regression model, where each regression output of the model is a respective dimensional evaluation score.

In some embodiments, given a provider evaluation machine learning model that is configured to determine multi-dimensional evaluation vectors each having n dimensional evaluation scores, for each multi-dimensional evaluation vector that is associated with a particular provider profile: (i) a subset of the n dimensional evaluation scores are determined using the statistical inference sub-model of the provider evaluation machine learning model and based at least in part on statistical inferences performed across historical operational data associated with the provider profile, (ii) a subset of the n dimensional evaluation scores are determined using the regression sub-model and based at least in part on regression outputs determined based at least in part on engineered features of the provider profile (e.g., engineered features describing a population density of a locality of the provider profile, a population density of a locality of the provider profile and a proximate provider density of the locality, and/or the like), and/or (iii) a subset of the n dimensional evaluation scores are determined by aggregating/combining: (i) first evaluation components determined using the statistical inference sub-model of the provider evaluation machine learning model and based at least in part on statistical inferences performed across historical operational data associated with the provider profile, and (ii) second evaluation components determined using the regression sub-model and based at least in part on regression outputs determined based at least in part on engineered features of the provider profile.

At step/operation 603, the predictive data analysis computing entity 106 determines the generic redirection score based at least in part on each dimensional evaluation score of the multi-dimensional evaluation vector. In some embodiments, given a multi-dimensional evaluation vector having n dimensional evaluation scores, the predictive data analysis computing entity 106 first normalizes the n dimensional evaluation scores into a unified range (e.g., a unified range of [0, 1]) to generate n normalized dimensional evaluation scores and then combines/aggregates (e.g., averages, computes a weighted average of, and/or the like) the n normalized dimensional evaluation scores to generate the generic redirection score. In some embodiments, given a multi-dimensional evaluation vector having n dimensional evaluation scores, the predictive data analysis computing entity 106 first normalizes the n dimensional evaluation scores into a unified range (e.g., a unified range of [0, 1]) to generate n normalized dimensional evaluation scores, then applies a trained weight to each normalized dimensional evaluation score to generate n weighted dimensional evaluation scores, and then combines/aggregates the n normalized dimensional evaluation scores to generate the generic redirection score.

Returning to FIG. 4, as described above, in some embodiments, a predicted redirection score may be determined based at least in part on a real-time redirection score. A real-time redirection score may describe a predicted measure of suitability of a provider profile to address a service request data object that is determined based at least in part on one or more diagnostic point-in-time features of the service request data object and one or more dynamic operational features of the provider profile. In some embodiments, a real-time redirection score is a "point-in-time score" that indicates how much a given medical/healthcare facility is an optimal facility for a given patient based at least in part on real-time features of the patient that are not described by the probabilistic diagnosis data object for the patient, such as the patient's real-time location, diagnostic acuity, reported pain level, and/or other administrative factors of the patient. The real-time redirection score may be used to adjust a generic prediction score based at least in part on real-time considerations and augment the generic prediction scores by considering unique patients' details that are not captured by the probabilistic diagnostic data object that is associated with the patient.

In some embodiments, a real-time redirection score may be determined using the steps/operations of the process 403B that is depicted in FIG. 7. The process 403B begins at step/operation 701 when the predictive data analysis computing entity 106 identifies one or more diagnostic point-in-time features of the service request data object. A diagnostic point-in-time feature may describe any property of a corresponding service request data object that is not described by the probabilistic diagnosis data object for the service request data object. As the probabilistic diagnosis data object may be associated with a unique combination of probabilistic diagnosis values that define a unique combination, it can in some embodiments be thought of defining of features associated with a "generic patient" of the unique combination. However, other properties of the patient not described by the probabilistic diagnosis data object may be relevant to predicted redirection score generation processes described herein. Examples of such properties include patient's location, patient's pain acuity, patient's level of pain, and/or the like. Accordingly, examples of diagnostic point-in-time features include one or more of real-time location, real-time condition severity, real-time acuity, and/or the like.

At step/operation 702, the predictive data analysis computing entity 106 identifies one or more dynamic operational features of the provider profile. A dynamic operational feature may describe a property of a provider profile whose corresponding feature value depends on one or more diagnostic point-in-time features of a service request data object. Examples of dynamic operational features include a distance feature that describes a relative distance of a facility to a real-time location of a patient that is associated with a service request data object, a severity level suitability feature that describes suitability of a facility to handle a real-time condition severity of a patient that is associated with a service request data object, a pain level suitability feature that describes suitability of a facility to handle a real-time pain severity of a patient that is associated with a service request data object, an administrative suitability feature that describes suitability of a facility to handle an administrative need of a patient that is associated with a service request data object, and/or the like.

In some embodiments, dynamic operational features are extracted at an asynchronous time (e.g., periodically). For example, in some embodiments, at an asynchronous provider data retrieval time, asynchronous provider feature data associated with a provider profile are retrieved, and one or more dynamic operational features are then determined based at least in part on the asynchronous provider feature data. In some embodiments, dynamic operational features are extracted at a request time associated with a time when a service request data object is received from a client computing entity that is associated with a request-initiating user profile. For example, in some embodiments, at an asynchronous provider data retrieval time, asynchronous provider feature data associated with a provider profile are retrieved, and one or more dynamic operational features are then determined based at least in part on the asynchronous provider feature data.

At step/operation 703, the predictive data analysis computing entity 106 processes the one or more diagnostic point-in-time features and the one or more dynamic operational features using a real-time adjustment machine learning model to generate the real-time redirection score. In some embodiments, the real-time adjustment machine learning model is a trained machine learning model that is configured to process diagnostic point-in-time features for a service request data object and one or more dynamic operational features of a provider profile to determine a real-time redirection score for the provider profile with respect to the service request data object. In some embodiments, the real-time adjustment machine learning model comprises a recurrent neural network machine learning model, the recurrent neural network machine learning model is configured to sequentially process a sequence of model inputs via a sequence of timesteps until a terminal timestep that is associated with a redirection score expectation time, and the real-time redirection score is determined based at least in part on a hidden state value for the terminal timestep.

In some embodiments, the real-time adjustment machine learning model comprises a recurrent neural network machine learning model, where the recurrent neural network machine learning model is configured to, at each timestep, process model input data for the timestep and a hidden state value of a preceding timestep of the noted timestep (or, for the initial timestep, a default hidden state value) to generate a hidden state value for the noted timestep. In some embodiments, during each nth timestep, the model input data for the nth timestep include an nth diagnostic point-in-time features of a sequence of m diagnostic point-in-time features of a service request data object and an nth dynamic operational feature of a sequence of m dynamic operational features. In some embodiments, the n timesteps may be a value that is less than or equal to m, because in some embodiments the model output is expected at a redirection score expectation time (e.g., within 30 seconds) and thus the processing needs to stop before processing all of the sequences if the threshold time is reached. In some embodiments, the real-time redirection score is determined based at least in part on a hidden state value for the terminal timestep of the recurrent neural network machine learning model.

In some embodiments, the real-time adjustment machine learning model is configured to determine a point-in-time match for an existing provider profile associated with an existing medical/healthcare facility. In some embodiments, given a patient's location and probabilistic diagnosis, the real-time adjustment machine learning model will query whether the targeted facility is well-equipped (i.e., has a high generic redirection score) to serve the patient. If the answer is "yes," then real-time adjustment machine learning model may search for closer facilities which also may be well-equipped, and offer the user the option of the original or closer facilities. If the targeted facility is not well-equipped, then real-time adjustment machine learning model may search from a growing radius around the patient until a well-equipped facility is found, and declare this the best point-in-time match. In some embodiments, and depending on acuity and need for stabilization, administrative factors such as in-network and out-of-network providers may be considered in determining which facility is the point-in-time match. In some embodiments, rather than agreeing that a facility is well-equipped based at least in part on the generic redirection score of the facility, the real-time adjustment machine learning model compares nearby facilities and offers the user choices based at least in part on relative generic redirection scores. The point-in-time match now becomes in part, user choice. At times, the patient may be given a choice, based at least in part on parameters that are announced to the user (e.g., "drive an extra five miles if you'd like a potentially shorter wait time.").

Returning to FIG. 4, once generated, the generic redirection score and the real-time redirection score may be combined/aggregated to generate the predicted redirection score. In some embodiments, combining/aggregating the generic redirection score and the real-time redirection score comprises applying a first weight to the generic redirection score to generate a weighted generic redirection score, applying a second weight to the real-time redirection score to generate a weighted real-time redirection score, and combining/aggregating the weighted generic redirection score and the weighted real-time redirection score to generate the predicted redirection score. In some embodiments, if only t of m potential timesteps of a recurrent neural network machine learning model are performed before a terminal timestep of the recurrent neural network machine learning model whose hidden state value is used to generate the real-time redirection score, the second weight described above is determined based at least in part on t/m.

By using predicted redirection scores as determined using at least some of the techniques discussed in relation to step/operation 403, various embodiments of the present invention introduce techniques for using the output of a diagnosis prediction machine learning model to generate a redirection score. By using the noted techniques, various embodiments of the present invention enable using pre-trained diagnosis prediction machine learning models to generate a redirection score, thus reducing or avoiding the need for computationally expensive operations that are performed to generate diagnosis prediction machine learning models. In this way, various embodiments of the present invention reduce the number of computational operations performed to generate redirection scores, thus improving the computational efficiency of predictive data analysis systems that are configured to generate redirection scores and make important technical contributions to the field of predictive data analysis.

At step/operation 404, the predictive data analysis computing entity 106 performs one or more prediction-based actions based at least in part on the predicted redirection score. In some embodiments, in response to determining that the predicted redirection score for a provider profile satisfies a predicted redirection score threshold, performing the one or more prediction-based actions includes performing operations that are configured to enable redirecting of the patient associated with the service request data object to the facility associated with the provider profile.

In some embodiments, assuming that the predicted redirection score for a provider profile satisfies a predicted redirection score threshold, step/operation 404 can be performed in accordance with the process 404A that is depicted in FIG. 8. The process 404A begins at step/operation 801 when the predictive data analysis computing entity 106 prompts a physician associated with an existing provider profile to agree to the redirection to the provider profile. In some embodiments, prior to patient arrival, if the predicted redirection score satisfies a threshold, the predictive data analysis computing entity 106 prompts the physician and/or proxy for that physician, to seek human input. Such prompts may be textual in nature, e.g., on a video monitor or mobile device, or they could be audible, e.g., through a mobile device or a smart speaker. In some embodiments, the prompts could be tactile or delivered through yet other electronic systems.

In some embodiments, if a physician agrees to redirection, then three possibilities exist: in some embodiments, this new facility may be established by default, e.g., for a rural clinic to send complex cases to a more advanced hospital nearer to a city; in other embodiments, physician may provide input on the new facility; in yet other embodiments, the new facility is selected using predicted redirection scores. The physician, patient, and/or proxy, might accept or deny the redirection recommendation. Giving this final authority to a practitioner is in some embodiments configured to mitigate legal risk for the adopting clinics.

At step/operation 802, the predictive data analysis computing entity 106 communicates with the new facility of the provider profile. This may include either an electronic offer to establish voice and/or video call links with the new facility. Alternatively, it could include an automated electronic handshake between facilities to be established. In either case, the purpose may be to inform and/or obtain consent to send the patient to the new facility. The receiving facility may be alerted of an incoming trauma or clinical patient, unless they have a preestablished operational agreement that all cases will be directed there.

At step/operation 803, the predictive data analysis computing entity 106 transmits the redirection request to the patient associated with the service request data object. In some embodiments, this is accomplished via either an electronic request sent to a mobile application of the patient, or through the establishment of a voice communication channel. The request may inform the patient of where to go for treatment. In some embodiments, this process is performed only for non-life-threatening conditions, based upon the diagnostic tool's output and clinician concurrence. In some embodiments, this redirect request may come from a proxy of the original or redirect destinations, from the orchestrating redirect agent, or the diagnosis agent.

In some embodiments, to perform step/operation 803, the predictive data analysis computing entity 106 transmits navigation instructions or other facility information to the patient. This may comprise sending a link to a third-party app, or the health app could use an integrated mapping service, drawing from application programming interfaces (APIs) of that established service. This facility information could include other information, such as drop-off instructions or parking details. In varying embodiments, this navigation or facility information may come from a proxy of the original or redirect destinations, from the orchestrating redirect agent, or the diagnosis agent. An operational example of a navigation instruction prompt 900 that may be transmitted to a patient by the predictive data analysis computing entity 106 is depicted in FIG. 9.

In some embodiments, the redirect agent could assess member eligibility and refer in-network facilities, saving the patient money. It could also indicate the severity of the diagnostic hypothesis and indicate the best transport option: ambulance (e.g., 911 alert), self-drive, by being driven by someone, or by scheduling an ambulatory future appointment. In some embodiments, the patient may not specify an initial location for healthcare delivery, but rather could simply take the suggestion provided by the (re) direction agent.

As described above, various embodiments of the present invention introduce techniques for using the output of a diagnosis prediction machine learning model to generate a redirection score. By using the noted techniques, various embodiments of the present invention enable using pretrained diagnosis prediction machine learning models to generate a redirection score, thus reducing or avoiding the need for computationally expensive operations that are performed to generate diagnosis prediction machine learning models. In this way, various embodiments of the present invention reduce the number of computational operations performed to generate redirection scores, thus improving the computational efficiency of predictive data analysis systems that are configured to generate redirection scores and make important technical contributions to the field of predictive data analysis.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

receiving, by one or more processors, a service request data object for a user that is associated with (i) a probabilistic diagnosis data object and (ii) a diagnostic point-in-time feature that identifies at least a real-time location of the user;

determining, by the one or more processors and based at least in part on a search radius around the real-time location of the user, a first provider data object comprising (i) a first static operational feature associated with a first provider profile and (ii) a first dynamic operational feature associated with the first provider profile;

determining, by the one or more processors, using a first machine learning model, and based at least in part on the first static operational feature and the probabilistic diagnosis data object, a first generic redirection score for the first provider profile;

in response to determining that the first generic redirection score fails to satisfy a first threshold, expanding, by the one or more processors, the search radius around the user to identify a second provider data object comprising (i) a second static operational feature associated with a second provider profile and (ii) a second dynamic operational feature associated with the second provider profile;

determining, by the one or more processors, using the first machine learning model, and based at least in part on the second static operational feature and the probabilistic diagnosis data object, a second generic redirection score for the second provider profile;

determining, by the one or more processors and using a second machine learning model that is distinct from the first machine learning model, and based at least in part on the diagnostic point-in-time feature and the second dynamic operational feature, a real-time redirection score for the second provider profile;

determining, by the one or more processors and based at least in part on the second generic redirection score and the real-time redirection score, a predicted redirection score for the second provider profile; and in response to determining that the predicted redirection score satisfies a second threshold, navigating, by the one or more processors and via an integrated mapping service, the user to a physical location associated with the second provider data object by:

rendering of a prompt within a first client device corresponding to the second provider data object, responsive to receiving a first acceptance of the prompt from the first client device, establishing an electronic handshake between the first client device and a second client device associated with the service request data object, and responsive to receiving a second acceptance via the electronic handshake, rendering a navigation instruction prompt within a third client device corresponding to the user, wherein the navigation instruction prompt comprises a link to the integrated mapping service.

2. The computer-implemented method of claim 1, wherein the first static operational feature is determined by:

retrieving asynchronous provider feature data associated with the first provider profile at an asynchronous provider data retrieval time; and determining the first static operational feature based at least in part on the asynchronous provider feature data.

3. The computer-implemented method of claim 1, wherein the first static operational feature is determined by:

retrieving on-the-fly provider feature data at a request receipt time associated with the service request data object; and determining the first static operational feature based at least in part on the on-the-fly provider feature data.

4. The computer-implemented method of claim 1, wherein determining the first generic redirection score comprises:

determining, based at least in part on an output of processing the first static operational feature using the first machine learning model, a multi-dimensional evaluation vector for the first provider profile that describes a plurality of dimensional evaluation scores that respectively correspond to a plurality of provider evaluation dimensions; and determining, based at least in part on the plurality of dimensional evaluation scores, the first generic redirection score.

5. The computer-implemented method of claim 4, wherein:

the plurality of provider evaluation dimensions comprises a relative expertise dimension; and a dimensional evaluation score of the relative expertise dimension describes an expertise measure of a geographically proximate provider profile associated with the first provider profile, wherein the geographically proximate provider profile is based at least in part on the search radius.

6. The computer-implemented method of claim 1, wherein:

the second machine learning model comprises a recurrent neural network, the recurrent neural network is configured to sequentially process a sequence of model inputs via a sequence of timesteps until a terminal timestep that is associated with a redirection score expectation time, and the real-time redirection score is determined based at least in part on a hidden state value for the terminal timestep.

7. The computer-implemented method of claim 6, wherein a model input for an nth timestep comprises an nth diagnostic point-in-time feature of one or more diagnostic point-in-time features and an nth dynamic operational feature of one or more dynamic operational features.

8. A system comprising:

one or more processors; and at least one memory storing processor-executable instructions that, when executed by any one or more of the one or more processors, causes the one or more processors to perform operations comprising:

receiving a service request data object for a user that is associated with (i) a probabilistic diagnosis data object and (ii) a diagnostic point-in-time feature that identifies at least a real-time location of the user;

determining, based at least in part on a search radius around the real-time location of the user, a first provider data object comprising (i) a first static operational feature associated with a first provider profile and (ii) a first dynamic operational feature associated with the first provider profile;

determining, using a first machine learning model, and based at least in part on the first static operational feature and the probabilistic diagnosis data object, a first generic redirection score for the first provider profile;

in response to determining that the first generic redirection score fails to satisfy a first threshold, expanding the search radius around the user to identify a second provider data object comprising (i) a second static operational feature associated with a second provider profile and (ii) a second dynamic operational feature associated with the second provider profile;

determining, using the first machine learning model, and based at least in part on the second static operational feature and the probabilistic diagnosis data object, a second generic redirection score for the second provider profile;

determining, using a second machine learning model that is distinct from the first machine learning model, and based at least in part on the diagnostic point-in-time feature and the second dynamic operational feature, a real-time redirection score for the second provider profile;

determining, based at least in part on the second generic redirection score and the real-time redirection score, a predicted redirection score for the second provider profile; and in response to determining that the predicted redirection score satisfies a second threshold, navigating, via an integrated mapping service, the user to a physical location associated with the second provider data object by:

rendering of a prompt within a first client device corresponding to the second provider data object, responsive to receiving a first acceptance of the prompt from the first client device, establishing an electronic handshake between the first client device and a second client device associated with the service request data object, and responsive to receiving a second acceptance via the electronic handshake, rendering a navigation instruction prompt within a third client device corresponding to the user, wherein the navigation instruction prompt comprises a link to the integrated mapping service.

9. The system of claim 8, wherein the first static operational feature is determined by:

retrieving asynchronous provider feature data associated with the first provider profile at an asynchronous provider data retrieval time; and determining the first static operational feature based at least in part on the asynchronous provider feature data.

10. The system of claim 8, wherein the first static operational feature is determined by:

retrieving on-the-fly provider feature data at a request receipt time associated with the service request data object; and determining the first static operational feature based at least in part on the on-the-fly provider feature data.

11. The system of claim 8, wherein determining the first generic redirection score comprises:

determining, based at least in part on an output of processing the first static operational feature using the first machine learning model, a multi-dimensional evaluation vector for the first provider profile that describes a plurality of dimensional evaluation scores that respectively correspond to a plurality of provider evaluation dimensions; and determining, based at least in part on the plurality of dimensional evaluation scores, the first generic redirection score.

12. The system of claim 11, wherein:

the plurality of provider evaluation dimensions comprises a relative expertise dimension; and a dimensional evaluation score of the relative expertise dimension describes an expertise measure of a geographically proximate provider profile associated with the first provider profile, wherein the geographically proximate provider profile is based at least in part on the search radius.

13. The system of claim 8, wherein:

the second machine learning model comprises a recurrent neural network, the recurrent neural network is configured to sequentially process a sequence of model inputs via a sequence of timesteps until a terminal timestep that is associated with a redirection score expectation time, and the real-time redirection score is determined based at least in part on a hidden state value for the terminal timestep.

14. The system of claim 13, wherein a model input for an nth timestep comprises an nth diagnostic point-in-time feature of one or more diagnostic point-in-time features and an nth dynamic operational feature of one or more dynamic operational features.

15. One or more non-transitory computer-readable storage media including instructions that, when executed by one or more processors, cause the one or more processors to perform operations, the operations comprising:

receiving a service request data object for a user that is associated with (i) a probabilistic diagnosis data object and (ii) a diagnostic point-in-time feature that identifies at least a real-time location of the user;

determining, based at least in part on a search radius around the real-time location of the user, a first provider data object comprising (i) a first static operational feature associated with a first provider profile and (ii) a first dynamic operational feature associated with the first provider profile;

determining, using a first machine learning model, and based at least in part on the first static operational feature and the probabilistic diagnosis data object, a first generic redirection score for the first provider profile;

in response to determining that the first generic redirection score fails to satisfy a first threshold, expanding the search radius around the user to identify a second provider data object comprising (i) a second static operational feature associated with a second provider profile and (ii) a second dynamic operational feature associated with the second provider profile;

determining, using the first machine learning model, and based at least in part on the second static operational feature and the probabilistic diagnosis data object, a second generic redirection score for the second provider profile;

determining, using a second machine learning model that is distinct from the first machine learning model, and based at least in part on the diagnostic point-in-time feature and the second dynamic operational feature, a real-time redirection score for the second provider profile;

determining, based at least in part on the second generic redirection score and the real-time redirection score, a predicted redirection score for the second provider profile; and in response to determining that the predicted redirection score satisfies a second threshold, navigating, via an integrated mapping service, the user to a physical location associated with the second provider data object by:

rendering of a prompt within a first client device corresponding to the second provider data object, responsive to receiving a first acceptance of the prompt from the first client device, establishing an electronic handshake between the first client device and a second client device associated with the service request data object, and responsive to receiving a second acceptance via the electronic handshake, rendering a navigation instruction prompt within a third client device corresponding to the user, wherein the navigation instruction prompt comprises a link to the integrated mapping service.

16. The one or more non-transitory computer-readable storage media of claim 15, wherein the first static operational feature is determined by:

retrieving asynchronous provider feature data associated with the first provider profile at an asynchronous provider data retrieval time; and determining the first static operational feature based at least in part on the asynchronous provider feature data.

17. The one or more non-transitory computer-readable storage media of claim 15, wherein the first static operational feature is determined by:

retrieving on-the-fly provider feature data at a request receipt time associated with the service request data object; and determining the first static operational feature based at least in part on the on-the-fly provider feature data.

18. The one or more non-transitory computer-readable storage media of claim 15, wherein determining the first generic redirection score comprises:

determining, based at least in part on an output of processing the first static operational feature using the first machine learning model, a multi-dimensional evaluation vector for the first provider profile that describes a plurality of dimensional evaluation scores that respectively correspond to a plurality of provider evaluation dimensions; and determining, based at least in part on the plurality of dimensional evaluation scores, the first generic redirection score.

19. The one or more non-transitory computer-readable storage media of claim 18, wherein:

the plurality of provider evaluation dimensions comprises a relative expertise dimension; and a dimensional evaluation score of the relative expertise dimension describes an expertise measure of a geographically proximate provider profile associated with the first provider profile, wherein the geographically proximate provider profile is based at least in part on the search radius.

20. The computer-implemented method of claim 1, wherein the first machine learning model comprises a multi-output regression machine learning model and the second machine learning model comprises a recurrent neural network machine learning model.

\* \* \* \* \*